US008224233B2

(12) United States Patent
Brisebois et al.

(10) Patent No.: US 8,224,233 B2
(45) Date of Patent: Jul. 17, 2012

(54) REGULATION OF SERVICE IN RESTRICTED TELECOMMUNICATION SERVICE AREA

(75) Inventors: Arthur Brisebois, Cumming, GA (US); Patrick Morrison, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 274 days.

(21) Appl. No.: 12/576,924

(22) Filed: Oct. 9, 2009

(65) Prior Publication Data
US 2011/0086614 A1 Apr. 14, 2011

(51) Int. Cl.
*H04K 3/00* (2006.01)
*H04W 24/00* (2009.01)

(52) U.S. Cl. .......................................... 455/1; 455/456.1

(58) Field of Classification Search .................. 455/411, 455/1
See application file for complete search history.

(56) References Cited

U.S. PATENT DOCUMENTS

| | | | | |
|---|---|---|---|---|
| 5,826,171 | A * | 10/1998 | Franke | 455/26.1 |
| 6,915,123 | B1 * | 7/2005 | Daudelin et al. | 455/410 |
| 2001/0031631 | A1 * | 10/2001 | Pitts | 455/411 |
| 2004/0203899 | A1 | 10/2004 | Curtis et al. | |
| 2006/0217121 | A1 | 9/2006 | Soliman et al. | |
| 2007/0254632 | A1 | 11/2007 | Beadle et al. | |
| 2009/0061759 | A1 * | 3/2009 | Stoddard et al. | 455/1 |
| 2009/0163216 | A1 | 6/2009 | Hoang et al. | |
| 2010/0075635 | A1 * | 3/2010 | Lim et al. | 455/411 |

OTHER PUBLICATIONS

US Senate Passes Bill Allowing Cellphone Jamming in Prisons; 1 pg; http://www.nasdaq.com/aspx/company-news-story.aspx?storyid=200910051932dowjonesdjonline000447—dated Oct. 9, 2009.
Prisons Plans to Shackle Cellphones; 3 pgs. http://certops.com/index.php/images/stories/videos/index.php?view=article&catid=1:latest-news&id=679:prison-plans-to-shackle-cellphones&format=pdf; Last accessed on Jan. 8, 2010.
International Search Report and Written Opinion for International Application No. PCT/US2010/050448, mailing date Nov. 29, 2010, 10 pages.

* cited by examiner

*Primary Examiner* — Nick Corsaro
*Assistant Examiner* — Joel Ajayi
(74) *Attorney, Agent, or Firm* — Turocy & Watson, LLP

(57) ABSTRACT

System(s) and method(s) are provided to regulate telecommunication service in a confined area in which telecommunication is restricted. Regulation includes control of wireless resources and access thereto, and monitoring wireless activity and locating sources thereof within the confined area. Regulation can be accomplished through networked femtocell access points and distributed antenna systems. Control of wireless resources is accomplished through selective jamming within the confined area; selective jamming can be updated based on performance metrics of telecommunication service. Configurable lists that authorize mobile device(s) to consume wireless service within the confined area control access to wireless resources. Access can be granted or denied statically or dynamically. Monitoring of wireless activity within the confined area includes tracking and recordation of signaling or traffic activity. The monitoring of signaling activity can enable location of a source of wireless activity, while monitoring of traffic can lead to identification of a user thereof.

23 Claims, 18 Drawing Sheets

REGULATION OF SERVICE IN RESTRICTED TELECOMMUNICATION SERVICE AREA

TECHNICAL FIELD

The subject innovation relates to wireless communications and, more particularly, to controlling access to wireless resources, and monitoring wireless activity and locating sources thereof within areas in which telecommunication is restricted.

BACKGROUND

Unauthorized wireless use is a major problem in restricted areas. The problem is particularly exacerbated in restricted areas in which telecommunication can lead to illicit activities or can cause harm to wireless user or third party. Various issues can originate from unauthorized wireless use. Using short message service (SMS), prisoners in correctional facility may control illegal outside activities. Accessing messaging applications in a mobile device may enable students to misrepresent knowledge or ability in examinations. Industrial or governmental spies may collect and deliver classified or proprietary information. An air controller that diverts attention from control activities to attend to cellphone call may cause aircraft collision with possible loss of life. Inconsiderate wireless users may disturb others in confined settings such as a theater, a church, a library, or the like.

To mitigate unauthorized wireless communication in restricted areas, typically adopted solutions relay primarily on negation of wireless resources (e.g., electromagnetic spectrum bandwidth) through deliberate spectral interference; such solutions are commonly known as radio jamming. Even though radio jamming is widely available and employed, it generally displays a number of utility inefficiencies: (1) Lack of spectral selectivity. For a specific block of EM spectrum, all radio frequencies, users, and calls sessions including emergency (e.g., E911) calls are blocked. The latter may lead to safety issues for users in the restricted areas. (2) Inability to allow for user tracking or location. Radio jammed calls cannot be traced or located. (3) Substantial implementation costs. Conventional radio jamming exploits considerable, expensive equipment and consumes significant power to negate wireless resources in wide blocks of EM spectrum. Such inefficiencies typically result in inadequate solutions for preventing unauthorized wireless communication in restricted areas.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the innovation. Its sole purpose is to present some concepts of the invention in a simplified form as a prelude to the more detailed description that is presented hereinafter.

The subject innovation provides system(s), device(s), and method(s) to regulate telecommunication service in a confined area in which telecommunication is restricted. Regulation of the telecommunication service includes control of wireless resources and access thereto, and monitoring wireless activity and locating sources thereof within the confined area. Regulation can be accomplished through networked femtocell access points and distributed antenna systems (DASs), even though system(s) without DASs also can provide substantially the same efficiencies. In implementation(s) based on DAS, transmission points can be distributed throughout the confined area in configuration that promotes generation of attachment signaling. A centralized component can manage at least a portion of regulation of the telecommunication service.

Control of wireless resources is accomplished through selective negation, or selective radio jamming, within the confined area. The selective radio jamming can be updated based on performance metrics of telecommunication service as provided in the wireless environment of the confined area. Updates can be effected through scanning of wireless environment at times which can be scheduled or determined based at least in part on the performance metrics. Such determination can be autonomously or automatically implemented. Configurable lists that authorize mobile device(s) to consume wireless service within the confined area control access to wireless resources. Access can be granted or denied statically or dynamically. Static grant or denial of access can be based on features of utilization of telecommunication service within the confined area, such as known presence of specific mobile devices in the confined area during specific periods, whereas dynamic grant or denial includes interactive, or on-demand, inclusion of mobile device(s) to one or more of the lists.

Monitoring of wireless activity within the confined area includes tracking and recordation of signaling or traffic activity. Recorded wireless activity can serve to generate intelligence on utilization of telecommunication service. In addition, various alarms can be delivered in accordance with control criteria and detected wireless activity. The monitoring of signaling activity also can enable location of a source of wireless activity, while monitoring of traffic can lead to identification of a user thereof.

It should be appreciated that aspects, features, or advantages of the subject innovation are network and radio technology agnostic, and can be exploited in substantially any network and through most any or any wireless communication technology. For example, Wi-Fi (wireless fidelity), Worldwide Interoperability for Microwave Access (WiMAX); IS-95; Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA), or LTE Advanced. Additionally, substantially all aspects of the subject innovation can include legacy telecommunication technologies.

While various aspects, features, or advantages of the subject innovation are illustrated through femtocell access point(s), such aspects and features also can be exploited in other types of indoor-based access points (e.g., home-based access point(s), enterprise-based access point(s)) that provide wireless coverage through substantially any or any disparate telecommunication technologies such as, but not limited to, Wi-Fi or picocell telecommunication.

To the accomplishment of the foregoing and related ends, the innovation, then, comprises the features hereinafter fully described. The following description and the annexed drawings set forth in detail certain illustrative aspects of the innovation. However, these aspects are indicative of but a few of the various ways in which the principles of the innovation may be employed. Other aspects, advantages and novel features of the innovation will become apparent from the following detailed description of the innovation when considered in conjunction with the drawings.

DETAILED DESCRIPTION

Figure 1:
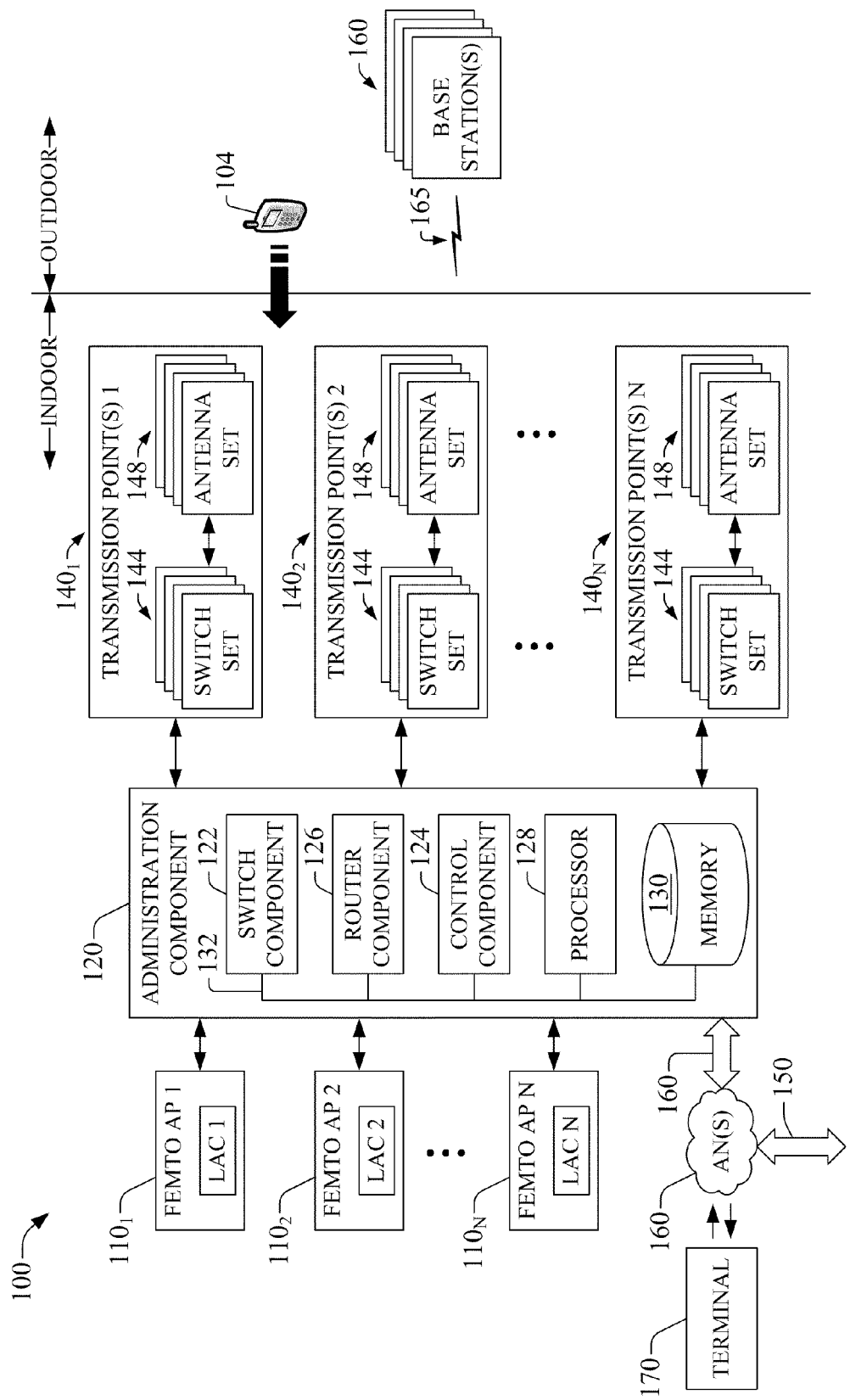
FIG. 1 is a block diagram of an example system that enables regulation of wireless service within a restricted area in accordance with aspects described herein.

The subject innovation is now described with reference to the drawings, wherein like reference numerals are used to refer to like elements throughout. In the following description, for purposes of explanation, numerous specific details are set forth in order to provide a thorough understanding of the present innovation. It may be evident, however, that the present innovation may be practiced without these specific details. In other instances, well-known structures and devices are shown in block diagram form in order to facilitate describing the present innovation.

As employed in this specification and annexed drawings, the terms "component," "system," "platform," "interface," "node," "coder," "decoder" and the like are intended to refer to a computer-related entity or an entity related to an operational apparatus with one or more specific functionalities, wherein the entity can be either hardware, a combination of hardware and software, software, or software in execution. One or more of such entities are also referred to as "functional elements." As an example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, node, coder, decoder, and the like.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment,"

"access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP);" "base station," "Node B;" "evolved Node B (eNode B);" "home Node B (HNB)" or "home access point (HAP)," which include femtocell access point, picocell access point, Wi-Fi base station . . . ; and the like, are utilized interchangeably in the subject application, and refer to a wireless network component or apparatus that serves and receives data, control, voice, video, sound, gaming, or substantially any data-stream or signaling-stream from a set of subscriber stations. Data and signaling streams can be packetized or frame-based flows. It is noted that context in the subject specification generally distinguishes among a base station that provides outdoor wireless coverage and a home access point (e.g., femtocell AP) that provides indoor wireless coverage; explicit distinction between indoor-serving AP and outdoor-serving base station is made when context may be insufficient to distinguish the utilized terms.

Furthermore, the terms "user," "subscriber," "customer," "consumer," and the like are employed interchangeably throughout the subject specification, unless context warrants particular distinction(s) among the terms. It should be appreciated that such terms can refer to human agents or automated components supported through artificial intelligence (e.g., a capacity to make inference based on complex mathematical formalisms) which can provide simulated vision, sound recognition and so forth.

The term "intelligence" as utilized herein with respect to a user or call session refers to substantially any or any information that characterizes the user or the call session and parties thereof. Intelligence can comprise, for example, originating or receiving mobile numbers or internet protocol (IP) identities; identity of service indoor-based access point; user information or identifying information of parties to the call session (e.g., billing address of one or more of the parties); call session information (e.g., elapsed time in a call); activities involving offered services or products, or the like.

As described in greater detail below, the subject innovation provides system(s) and method(s) that enable regulation of telecommunication service in a confined area in which telecommunication is restricted. Regulation includes control of wireless resources and access thereto, and monitoring wireless activity and locating sources thereof within the confined area. Regulation can be accomplished through networked femtocell access points and distributed antenna systems. Control of wireless resources is accomplished through selective jamming within the confined area; selective jamming can be updated based on performance metrics of the telecommunication service. Configurable lists that authorize mobile device(s) to consume wireless service within the confined area control access to wireless resources. Access can be granted or denied statically or dynamically. Monitoring of wireless activity within the confined area includes tracking and recordation of signaling or traffic activity. The monitoring of signaling activity can enable location of a source of wireless activity, while monitoring of traffic can lead to identification of a user thereof.

At least an advantage of the subject innovation is the scalability of the system(s) described herein afforded by utilization of low-cost femtocell access points and functional elements, e.g., server(s), for control thereof. At least another advantage of the subject innovation is the improved versatility of service domination, access control, and tracking features with respect to conventional jamming systems. In the subject innovation, service domination is selective and thus does not rely on blocking substantial portions of the electromagnetic spectrum. Accordingly, service domination as described herein allows service provisions, particularly of emergency calls. With respect to access control, provision of service within confined restricted area does not adversely affect privacy and can be customized to accommodate requirement of different mission-specific restricted areas. Customization of access to service affords improved service quality and reliability for authorized users. With respect to tracking, the subject innovation can enable location of unauthorized devices operating within the confined restricted area, since specific control and data wireless signals can propagate therein in view of the selective jamming provided in the subject innovation.

It is noted that features or aspects described in the subject innovation can rely, at least in part, on delivery or reception of directive(s), indication(s), request(s), or the like, and information or payload data (e.g., content(s)) associated therewith. Directive(s) can be embodied in multi-bit words (e.g., P-bit words, with P an integer) and coded to specifically convey a request(s) to a particular functional element (e.g., a femtocell AP) in order to execute specific operation(s). Information or payload within signaling, and request(s) or indication(s) conveyed therein, can be embodied, for example, in one or more reserved bits in a packet header, a light-payload (e.g., of the order of 1 byte) data packet, a predetermined multi-bit word conveyed in a control channel, a light-payload file (e.g., a cookie), an email communication, an instant message, or the like. In addition, directive(s), request(s), indication(s) or the like, as described herein, can be delivered in accordance with various protocols such as file transfer protocol (FTP), secure shell FTP (SFTP), FTP over secure socket layer (FTPS), short message service (SMS) protocol, multimedia messaging service (MMS) protocol, unstructured supplementary service data (USSD) standard, simple network management protocol (SNMP), or the like.

With respect to the drawings, FIG. 1 is a block diagram of an example system 100 that enables regulation of wireless service within an indoors restricted area in accordance with aspects described herein. The indoors restricted area can be a correctional facility; a classroom or lecture hall in an educational institution, entertainment premises such as a theater; a meeting room in a public or private sector organization wherein sensitive, confidential, or classified subject matter is disclosed; a church; a library; or the like. Example system 100 is deployed within a region (indicated as "Indoor" in drawing) that comprises the indoors restricted area. The example system 100 includes a set of N femto access points $110_1$-$110_N$, with N a natural number, functionally connected to an administration component 120, which is functionally coupled to a set of N transmission points $140_1$-$140_N$, and linked to a femtocell network platform (femtocell gateway node(s), server(s), memory(ies), etc.) via backhaul link 150 and through a backhaul network that is part of access network(s) (AN(s)) 160. In an aspect, backhaul link 150 can be embodied in one or more wired backbone network pipes such as an optical fiber backbone, a twisted-pair line, a T1/E1 phone line, a digital subscriber line (DSL) either synchronous or asynchronous, an asymmetric DSL, a coaxial cable, or the like. Backhaul link 150 also can include one or more wireless backbone link(s), e.g., a line-of-sight (LOS) or a non-LOS wireless link. In UMTS-based radio technology, backhaul link 150 is embodied, at least in part, in Iuh interface.

Administration component 120 can receive radio signals (e.g. radio frequency (RF) signals) in digital format generated at a femtocell AP, e.g., 110$_2$, and convert such radio signal(s) to signal(s) that can be delivered to transmission point(s), e.g., 140$_2$, linked to the femtocell AP and therefore relayed to a mobile device (e.g., 104). For instance, the radio signals can be converted to light signals, which can be transported through a fiber optic link to the transmission point(s). In an aspect, conversion of radio signal(s) at administration component 120 can be effected by switch component 122. Likewise, administration component 120 can receive non-wireless signal(s) from one or more transmission point(s) (e.g., 140), convert such signal(s) to a format or transport protocol (e.g., internet protocol) that can be consumed at a femto AP, and relay such signal(s) to femto AP(s) associated with the one or more transmission point(s). The non-wireless signal(s) can include traffic and signaling generated by a served mobile device (e.g., 104). In another aspect, switch component 122 can receive the non-wireless signals and effect the described conversion.

Administration component 120 also includes a router component 126 that manages traffic and signaling received from a serving femtocell network platform (not shown) and directed to one or more of femtocell APs 110$_1$-110$_N$. Signaling and traffic decoded at femto AP(s) can be transmitted to administration component 120, which delivers the decoded signaling and traffic to the serving femtocell network platform; in an aspect, router component 126 manages delivery of such decoded signaling and traffic. To implement management of traffic and signaling, router component 126 can schedule, queue, address, prioritize, assemble and identify packets, and so forth. Router component 126 also can manage non-wireless signal(s) received from one or more transmission point(s) and that are formatted to be consumed at one or more femto AP.

To enable delivery of non-wireless signals, each transmission point in sets of transmission point(s) 140$_1$-140$_N$ include a set of one of more switches 144 linked to a set of one or more respective antennas 148; it should be appreciated that, in an aspect, a single transmission point includes a single (switch, antenna) pair. Switch 144 converts wireless signals (e.g., radiofrequency (RF) signals) received through antenna 148 to signals that can be propagated to administration component 120 and relayed to a femto AP there from; as an example, wireless signals can be converted to light signals that can be propagated through a fiber optic link that operationally connects transmission point(s) to administration component 120.

In an aspect of the subject innovation, each femtocell AP 110$_\lambda$ with $\lambda=1, 2 \ldots N$, has a unique non-reused location area code (LAC) which is transmitted through respective transmission point(s) 140$_\lambda$. In addition to being mutually different, such location area codes (LAC 1-LAC N) are different from external control channels delivered by base station(s) 160 and detected through scanning of wireless environment as described herein. While LAC is an identifying pilot signal specific to UMTS-based technology, femtocell AP that operate in other radio technology also can be identified as described herein with pilot sequences or codes suitable to the other radio technology. Transmission points 140$_1$-140$_N$ are distributed throughout the restricted area in a correlated manner that results in each antenna in a transmission point having a set of nearest-neighbor antennas with disparate LACs. Such distribution, referred to herein as "interleaved distribution," of transmission points leads a mobile device (not shown) that operates in the restricted area to detect disparate LAC(s) and exchange (e.g., transmission and reception) attachment signaling with transmission point(s) as mobile device 104 enters and moves, in idle mode, within the restricted area. In an aspect, in UMTS-based radio technology, the attachment signaling can include at least one of location area update (LAU) signaling or routing area update (RAU) signaling. It is noted that in radio technologies other than 3GPP UMTS, alternative identifier(s) can be employed for each femto AP 110$_\lambda$ in order to force a mobile device to deliver attachment signaling when roaming from one transmission point to another. Such strategic distribution of transmission point(s) throughout the restricted area enables, at least in part, at least one of domination of service coverage or location of unauthorized mobile device(s). It is noted that in one or more additional or alternative embodiments, example system 100 can have femtocell APs 110$_1$-110$_N$ deployed throughout the indoors restricted area in accordance with the foregoing interleaved distribution and without reliance on transmission points 140$_1$-140$_N$ for communication of wireless signals, with such communication accomplished through one or more antennas in each of the femtocell APs 110$_\lambda$.

In another aspect of the subject innovation, administration component 120 can regulate, at least in part, wireless resources within the restricted area in which transmission points 140$_1$-140$_N$ are deployed. Regulation includes domination of wireless resources, or spectrum domination; in an aspect, domination entails selective blockade of specific radio channels in which control data is communicated by a set of macrocellular base stations 160 through over-the-air link(s) 165. To implement domination of wireless resources, administration component 120 includes a control component 124 that configures scanning of wireless environment in the vicinity of deployed transmission points 140$_1$-140$_N$. One or more of femto APs 110$_1$-110$_N$ scan, at least in part, the wireless environment and identify a set of control channels delivered by the set of base stations 160. The one or more femtocell APs schedule a set of frequency carriers that spectrally overlap the identified set of control channels and transmit the frequency carriers; transmission is implemented via administration component 120, or one or more components therein such as router component 126 and switch component 122, and one or more transmission points 140$_1$-140$_N$.

In addition, administration component 120 can control at least one of traffic or signaling collected at and delivered to one or more of transmission points 140$_1$-140$_N$. As part of control, administration component 120 can monitor, via control component 124, at least one of signaling or traffic served through femto APs 110$_1$-140$_N$ and delivered through one or more of transmission points 140$_1$-140$_N$. Monitoring of such signaling and traffic can be initiated in response to specific attachment signaling (e.g., LAU or RAU); for instance, initial attachment signaling detected from a specific mobile device identifier (e.g., IMSI) that enters the indoor restricted area can commence monitoring. Additionally, monitoring of traffic can be accomplished in accordance with Communications Assistance for Law Enforcement Act (CALEA) requirements or other legal framework or means. Monitored traffic and signaling can be retained in memory 130; in an aspect, retention protocol of the monitored traffic and signaling can be consistent with CALEA.

In addition, as an alternative or further part of control, administration component 120 also can generate and deliver "entry" alarm(s) or notification(s) to equipment, mobile or otherwise, associated with administration component; for example, the entry alarm(s) or notifications can be conveyed to a computer terminal and rendered in a display interface linked thereto. Moreover, femto AP(s) also can generate and deliver alarm(s) or notification(s) in response to specific attachment signaling, e.g., initial LAU or RAU upon entry of UE 104 into indoor restricted area. The alarm(s) or notification(s) generated by at least one of administration control 120 or the femto AP(s) can include automated call session(s) (e.g., voice or data) or automated message(s) such as SMS communication, MMS communication, or the like. Script(s) of the automated call session(s) or message(s) can be retained in at least memory 130. One such illustrative script can convey the following message: "unauthorized wireless access, monitoring activated," and be delivered to an unauthorized mobile device within confined restricted area. Alarm(s) and notification(s) can be recorded in memory 130.

An unauthorized mobile device can be detected by a femtocell AP in the set of femto APs $110_1$-$110_N$. Detection of unauthorized mobile devices also is a part of access control to wireless service and can be comprised within regulation of telecommunication service as disclosed in the subject innovation. The unauthorized mobile device can be negated wireless service or granted access to service on at least a temporary basis. Temporary access to wireless service can enable monitoring of at least one of signaling or traffic generated through the unauthorized mobile device, which can be advantageously exploited if administration component 120 or a manager thereof (human agent or automated component, for example, the administration of a correctional facility) intends to utilize call session information to identify user(s) of the unauthorized mobile device (e.g., 104) or associate(s), or to generate intelligence (e.g., a profile) related to the unauthorized user(s) or associate(s).

In an aspect, access control to wireless service is based at least in part on access control list(s) (ACL(s)) that can be retained in each femto AP in the set of femto APs $110_1$-$110_N$; access control protocol is activated by reception of attachment signaling at any of femto AP in such set. An ACL can be associated with one or more femto APs. Such association can be at least one of the following. (i) One-to-none, e.g., the ACL is logically available and retained in memory 130, but not is provisioned to a femtocell AP. (ii) One-to-one association, wherein the ACL is provisioned to a single femtocell AP. (iii) A many-to-one association, which occurs if wireless environment(s) associated with transmission point(s) linked to a single femtocell AP can serve disparate locations within the confined restricted area and thus disparate groups of users, each group with a dedicated ALC, the latter can be the case in which example system 100 is deployed in an enterprise environment. An ACL includes a set of field attributes that regulate access to telecommunication service and features of provision thereof via the one or more femto APs. In particular, one of the field attributes identifies mobile number of wireless device authorized to receive telecommunication service through the one or more femto APs to which the ACL is associated.

If a femto AP $110_J$, with LAC J ($1 \leq J \leq N$), in the set of femto APs $110_1$-$110_N$ receives attachment signaling (e.g., LAU signaling or RAU signaling) originated by a mobile device, e.g., 104, femto AP $110_J$ validates an identity of the mobile device, as conveyed in the attachment signaling, against an ACL that can reside in femto AP $110_J$. If the identity of the mobile device matches a respective mobile number or mobile identity in the ACL, the attachment procedure associated with attachment signaling is completed and femto AP $110_J$ allows the mobile device to camp therein and establish call sessions normally. If camped in femto AP 110J, the mobile device can receive LAC J, recognize it, and display a unique alphanumeric indicator that conveys telecommunication service is supplied through a femtocell AP. In the alternative, if validation against the ACL reveals no match amongst the identity of the mobile device and mobile identity (ies) retained in the ACL, femto AP $110_J$ rejects the attachment signaling and the mobile device is allowed only to establish emergency calls.

It is noted that ACL(s) also can include other field attributes that control service access logic for an identified mobile number, wherein such logic includes at least one of service priority, access schedule or time constraints, access quality of service, forwarding number(s), auto-reply configuration, or the like. In an example, if an employee whose mobile device is included in ACL(s) is in a supervisor role within an organization that deploys and utilizes example system 100, the employee can receive telecommunication service with higher priority than another employee whose device also is identified in ACL(s) but is in a supervisee role. In another example, the mobile number of the mobile device of the supervisee can have a field attribute in ACL(s) that indicates the femtocell AP to forward received calls to a disparate mobile number, e.g., the supervisor phone. It is noted that ACL(s), and attribute(s) therein, can enable access to service for an identified mobile device during a specific period of time; thus, an employee of the foregoing organization can be afforded wireless service in a personal mobile device at times outside the employee's job shift or at times the employee is not engaged in mission-critical activities. In an example scenario, a mobile device of a surgeon can be included in an ACL, but negated wireless service during a surgery session. In another example scenario, a mobile device of a student can be configured in an ACL to receive service at times other than in a test.

It is also noted that provision and negation of telecommunication service via ACL(s) can be accomplished without configuration of field attributes that establish a specific service logic; for example, the femtocell AP can receive updated instances of ACL(s) through a specific period wherein the updated instances include or exclude a specific mobile number. While less complex, such alternative to manage access to wireless service can increase processing load in the femtocell AP.

Control of access to telecommunication service based on access control list(s) as described supra can enhance coverage and service quality for all emergency calls and most any non-emergency voice and data call sessions. To implement, at least in part, such access control, administration component 120 can generate an access control list (ACL), and include or exclude a mobile device identifier (e.g., IMSI) from the generated ACL. Generation of an ACL can occur at a time of provisioning a femtocell AP within example system 100. At a time the ACL is generated, administration component 120 can pre-populate (or preset) the ACL with a set of mobile device identifiers linked to a predetermined set of individuals such as all employees of an organization that deploys and utilizes example system 100. Inclusion or exclusion of mobile device identifier can be automatically implemented in accordance with manipulation criteria that dictate instance in which the ACL is to be updated. Manipulation criteria can include time-based criteria, such as schedule(s) based on employee work shift. In the alternative or in addition, inclusion or exclusion can be effected interactively or on-demand through reception of requests to update the ACL and grant thereof. For example, identifier of mobile device of a specific authorized visitor can be added to an ACL, or a mobile device identifier can be added to an ACL for a predetermined period to allow and monitor call sessions for an unauthorized mobile device, wherein monitoring of the unauthorized mobile device can include identification of number(s) called by the unauthorized mobile device or number(s) that place a call thereto. Administration component 120 can grant or decline a request to update an ACL based on update privileges of a requestor (e.g., a human agent that manages administration component 120). In an aspect, inclusion of the mobile device identifier or exclusion thereof from an ACL can determine, at least in part, whether a mobile device is monitored or located within the indoor restricted area.

Interactive inclusion in an ACL of an unauthorized mobile device can be effected in response to receiving unauthorized attachment signaling from the mobile device. Control component can request identification credential(s) interactively from the mobile device and populate an ACL if an indication of consent to be monitored is received. Identification credential(s) can be received through terminal 170 via a network that is part of AN(s) 160. In case the confined restricted in which example system 100 is deployed is embodied in a correctional facility, terminal 170 can be part of a guarded entry point.

In example system 100, processor 128 can be configured to provide or can provide, at least in part, the described functionality of administration component 120 and various components therein. Processor 128 also can be configured to provide or can provide at least part of the functionality of femto AP $110_\lambda$ or transmission point(s) $140_\lambda$. To provide such functionality, processor 128 can exploit bus 132 to exchange data or any other information amongst disclosed memory(ies) and component(s) or subcomponents; bus 132 can be embodied in at least one of a memory bus, a system bus, an address bus, a message bus, a reference link, or any other conduit, protocol, or mechanism for data or information exchange. The information can include at least one of code instructions, code structure(s), data structures, or the like. In addition, processor 128 can execute code instructions (not shown) stored in memory 130, or alternative or additional memory components or elements therein, to implement or provide at least part of the described functionality of one or more components in example system 100. Such code instructions can include program modules or software or firmware applications that implement various methods described in the subject specification and that are associated, at least in part, with functionality or operation of example system 100.

In one or more embodiment(s), processor 128 can be distributed amongst two or more components that reside administration component 120. Further, in some embodiments, components that comprise administration component 120 can reside within memory 130 as one or more sets of code instructions that, when executed by processor 128, implement the various components and described functionality thereof.

Figure 2:
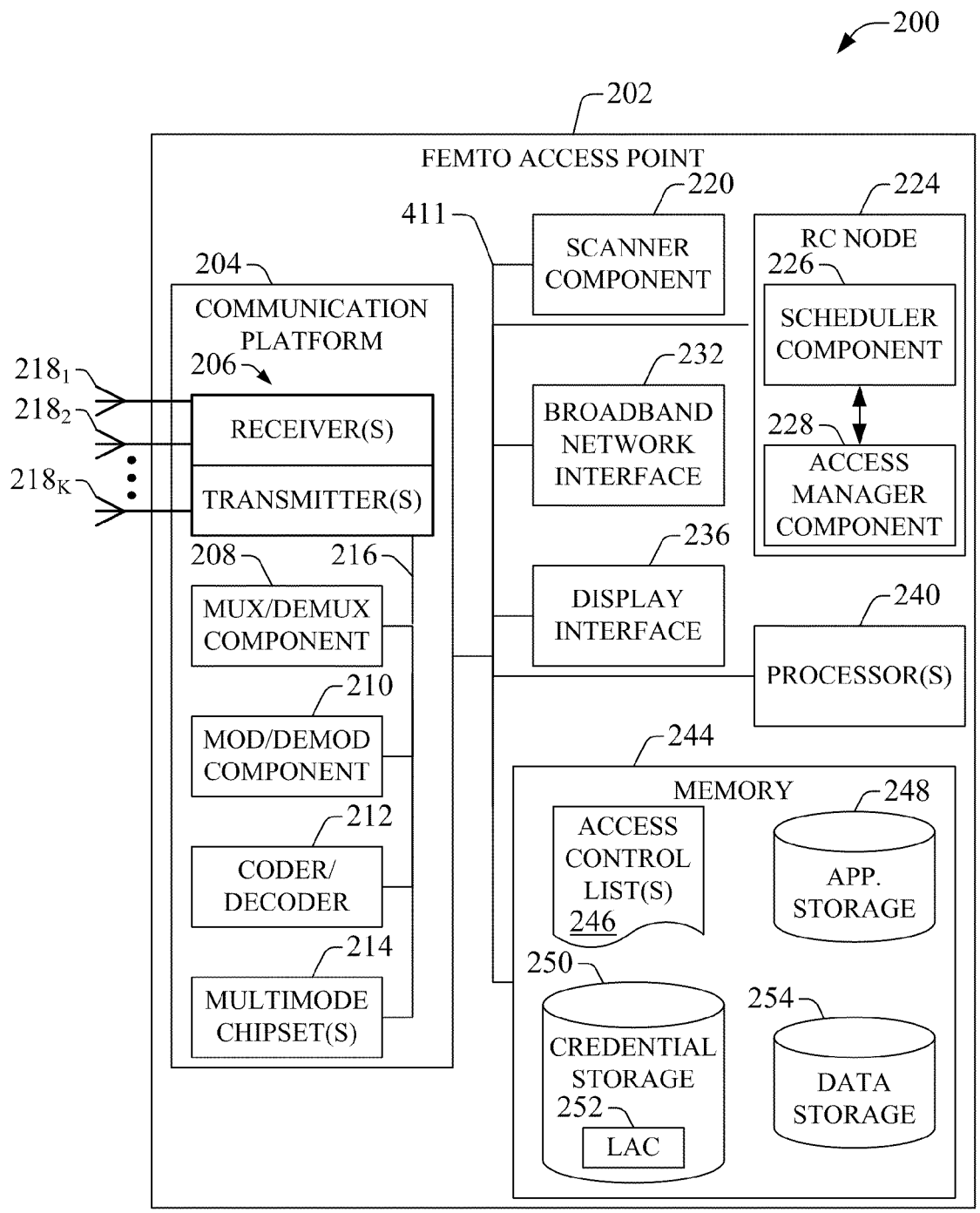
FIG. 2 displays an example embodiment of a femtocell access point that can operate in accordance with aspects of the subject innovation.

FIG. 2 illustrates an example embodiment 200 of a femtocell AP 202 that can operate in accordance with aspects of the subject innovation. Femtocell AP 202 can embody one or more of femto AP $110_1$-$140_N$. To enable wireless service, femto AP 202 includes communication platform 204, which delivers traffic and signaling directed to one or more transmission points (not shown) associated with femto AP 202. Communication platform 204 comprises a set of receiver(s)/transceiver(s) 206. While each transceiver in the set includes an antenna $218_\kappa$, with κ=1, 2, ... K, with K a natural number greater or equal than unity, each antenna $615_\kappa$ can be disabled (logically or physically) if wireless signals are delivered through antennas related to the one or more transmission points. In the subject innovation, receiver(s)/transceiver(s) 206 transmit and receive signal via broadband network interface 232, which is functionally connected to a router (not shown) in an administration component (e.g., 120).

Communication platform 204 comprises electronic components and associated circuitry that enable processing and manipulation, e.g., coding/decoding, deciphering, modulation/demodulation, of signal(s) received by femto AP 202 and signal(s) to be transmitted by femto AP 202; received or transmitted signal(s) are modulated and coded, or otherwise processed, in accordance with various radio technology protocols (e.g., 3GPP UMTS, 3GPP LTE ... ). Components, or functional elements, in communication platform 204 exchange information through a bus 216; information includes data, code instructions, signaling, or the like, and the bus 216 can be embodied in at least one of a system bus, and address bus, a data bus, a message bus, or a reference link or interface. The electronic components and circuitry can include the set of K receiver(s)/transmitter(s) 206 and component(s) therein, a multiplexer/demultiplexer (mux/demux) component 208, a modulator/demodulator component 210, a coder/decoder 212, and a set of one or more chipsets, e.g., multi-mode chipset(s) 214. Receiver(s)/transmitter(s) 206 can convert signal from analog to digital and vice versa. In addition, receiver(s)/transmitter(s) 206 can divide a single data stream into multiple parallel data streams, or perform the reciprocal operation; such operations typically conducted in various multiplexing schemes. Functionally coupled to receiver(s)/transmitter(s) 206 is a multiplexer/demultiplexer (mux/demux) component 208 that enables processing or manipulation of signal(s) in time and frequency space or domain. Electronic mux/demux component 208 can multiplex and demultiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 208 can scramble and spread information (e.g., codes) according to substantially any code; e.g., Hadamard-Walsh codes, Baker codes, Kasami codes, polyphase codes, and so on. A modulator/demodulator (mod/demod) component 210 also is a part of communication platform 204, and can modulate and demodulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In embodiment 200, mod/demod component 210 is functionally coupled to mux/demux component 208 via bus 216. In addition, processor(s) 240 enables, at least in part, femto AP 202 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Communication platform 204 also includes a coder/decoder 212 that operates on data in accordance with one or more coding/decoding schemes suitable for communication, at least in part, through one or more receivers(s)/transmitter(s) 206. When telecommunication through one or more transmission point(s) (not shown) associated with femto AP exploits multiple-input multiple-output (MIMO), multiple-input single-output (MISO), or single-input multiple-output (SIMO) operation, coder/decoder 212 can implement at least one of space-time block coding (STBC) and associated decoding; or space-frequency block (SFBC) coding and associated decoding. Coder/decoder 212 also can extract information from data streams coded in accordance with spatial multiplexing scheme. To decode received information, e.g., data or control, coder/decoder 212 can effect at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. In addition, to operate in the manner described herein, coder/decoder 212 can employ, at least in part, mux/demux component 208 and mod/demod component 210.

In addition, communication platform 204 can process signal(s) originated in a wireless environment within a set of one or more EM radiation frequency bands, also referred to herein as frequency bands. The set can comprise radio frequency (RF) portion(s) and microwave portion(s) of the EM spectrum, although other spectral regions such as infrared (IR) also can be included. In an aspect, the set of one or more EM radiation frequency bands can include at least one of (i) all or substantially all licensed EM frequency bands, or (ii) all or substantially all unlicensed frequency bands currently available for telecommunication. It is noted that the set is re-configurable and can be upgraded to incorporate frequency bands, or frequency carriers therein, as such bands or carriers become available for telecommunication, e.g., auctioned for utilization or authorized for free-of-charge utilization. In addition, communication platform 204 can operate in accordance with a configurable set of radio technologies, or communication protocols thereof. As new radio technologies become standardized, or available, a network operator that provides telecommunication service can introduce such technologies in the set of radio technologies that can be utilized for telecommunication through a femto AP 202 deployed in a confined restricted area.

In embodiment 200, multimode chipset(s) 214 can femto 202 to operate in multiple communication modes through various radio network technologies (e.g., second generation (2G), third generation (3G), fourth generation (4G)) or deep-space satellite-based communication in accordance with disparate technical specifications, or standard protocols, for the radio network technologies or satellite communication. The various radio network technologies being part of the set of radio technologies indicated supra. In an aspect, multimode chipset(s) 214 can enable, at least in part, communication platform 204 to operate in accordance with standard protocols specific to a telecommunication mode of operation, e.g., LTE-based communication. In another aspect, multimode chipset(s) 214 can be scheduled to operate concurrently in various modes or within a multitask paradigm in which the multimode chipset(s) 214 operates in a dedicated mode for a specific time interval.

Conventionally, as part of configuration or re-configuration, a femtocell AP may scan wireless activity and associated data to determine satisfactory operating parameters such as channel(s) in spectrum areas of least interference, and avoid transmission of femtocell carriers in spectral regions that transport external control channels. In the subject innovation, femto AP 202 scans and decodes signals associated with macro wireless coverage within the indoor wireless environment in vicinity of a transmission point (e.g., $140_1$) in order to dominate wireless resources and service without avoidance of spectral regions that transport external control channels. Scanned signals are downlink signals and can include at least one of pilot signal(s) and system broadcast message(s), and traffic signal(s). System broadcast message(s) can be specific message(s) linked to specific radio technologies and conveyed through disparate frequency carriers.

A scan conducted by femto AP 202, or most any or any indoor-based access point, can survey and compare wireless signals transported in a set of electromagnetic (EM) radiation frequency bands and in accordance with a set of telecommunication protocols associated with respective set of radio technologies. Signal(s) originated within the set of EM radiation frequency bands can be processed, at least in part, by communication platform 204. The set of EM frequency bands, which can comprise radio frequency (RF) portion(s) and microwave portion(s) of the EM spectrum, and the set of radio technologies can be determined by a network operator that manages femtocell AP 202 and an associated femtocell network. In addition, the set of EM frequency bands can include all EM frequency bands licensed by a telecommunication carrier (e.g., personal communication services (PCS), advanced wireless services (AWS), general wireless communications service (GWCS), and so forth); or all unlicensed frequency bands currently available for telecommunication (e.g., the 2.4 GHz industrial, scientific and medical (ISM) band or one or more of the 5 GHz set of bands). The telecommunication carrier can be the network operator that administers wireless service via the femtocell AP 202 or through macrocellular base stations, or it can be a competing network operator. Accordingly, survey of such EM frequency bands can allow collection of signaling data delivered from base stations that provide macro wireless service and are operated by a telecommunication carrier. The set of radio technologies surveyed during the scan of indoor wireless environment includes one or more telecommunication technologies such as Wi-Fi, WiMAX, 3GPP2 UMB, Enhanced GPRS, 3GPP UMTS, 3GPP LTE, HSPA, HSDPA, HSUPA, or LTE Advanced. It is noted that frequency bands, or frequency carriers therein, can be added to the set of EM frequency bands as such bands or carriers become available for communication, e.g., auctioned for utilization or cleared for free-of-charge utilization. Similarly, as new radio technologies become standardized, or available, such technologies can be introduced in the set of radio of technologies that is surveyed.

Scanning of indoor wireless environment in vicinity of transmission point(s) can proceed in polling mode. Through delivery of a scan directive or request, administration component 120 directs femto AP 202 to scan and assess the indoor wireless environment in vicinity of transmission point(s) linked to femto AP 202 (not shown in FIG. 2). Directives can be conveyed periodically or in accordance to a schedule. Polling period $\tau$, or rate $\tau^{-1}$, is configurable and determined by a manager of administration component 120, wherein the manager is a human agent or a component, e.g., control component 124. Similarly, manager of administration component 120 can configure the polling schedule that dictates communication of scan directives at predetermined instants. If a scan directive is received at femto AP 202 (e.g., via broadband network interface 232 which enables incoming and outgoing data flow) service load at the femtocell, or load of processor(s) 240, is evaluated and the directive is accepted or rejected. Evaluation can be based upon performance criteria (not shown) retained in memory 244 based at least in part on at least one of in-building service quality (e.g., UL signal strength originated from mobile device(s) served through femto AP 202) or capacity (e.g., number of subscribers attached to femto AP 202, scheduled traffic, queued traffic or signaling . . . ) of femto AP 210. Acceptance or rejection is indicated via an ACK (acknowledge) or NACK (negative acknowledge) signal; ACK/NACK can be embodied, for example, in one or more reserved bits in a packet header, a light-payload (e.g., of the order of 1 byte) data packet, a predetermined multi-bit word conveyed in a radio frame within a control channel, etc. If acceptance is indicated, administration component 120 can convey a scan configuration (not shown) that includes a set of measurements to be performed. Rejection can result in implementation of a retry cycle at administration component 120 in which a predetermined number M, an integer, of scan directives are delivered at predetermined intervals until the directive is accepted or M attempts are completed. In an aspect, a set of one or more processors in processor(s) 240 can be dedicated to operate, at least in part, scanner component 220, to mitigate performance degradation of femto AP 210 when measurement of wireless signals are collected.

To scan wireless environment, scanner component 220 can detect signals that include DL reference signal(s), which can be transported through wireless link 165. Scan of the indoor wireless environment of transmission point(s) (not shown) linked to femto AP 202 surveys received wireless signals over a configured set of EM frequency bands, as indicated supra. To conduct a scan, scanner component 220 exploits at least in part communication platform 204. In an aspect, scanner component(s) 220 can configure receiver(s)/transmitter(s) 206 to collect signal(s) generated in a specific frequency carrier, e.g., frequency channel. Such configuration can allow determination of downlink (DL) carrier frequency, or channel number. Additionally, scanner component 220 can configure demodulation and demultiplexing operation of communication platform 204, or a components therein, in accordance with standard protocols associated with the plurality of disparate telecommunication technologies that are surveyed; in an aspect, the various telecommunication protocols and instructions necessary for implementation thereof can reside in memory 244. Thus, demodulation and demultiplexing configuration enable determination of radio technology employed in DL signal (e.g., DL reference signal(s) 262) or UL signal (e.g., UL reference signal(s) 272). Communication platform 204 includes circuitry, e.g., one or more chipsets such as multimode chipset(s) 214, and at least one or more processors, which can be part of processor(s) 240, to switch radio technologies (e.g., IS-95, WiMAX . . . ) within a configurable and upgradable set of technologies in order to effect telecommunication and enable a scan (e.g., decoding or deciphering of signal(s)) in accordance with configured demodulation and demultiplexing associated with a radio technology. Such radio technology agility can afford blind determination, e.g., identification by inspection, of a radio technology employed for communication within the indoor wireless environment.

Scanner component 220 can decode received wireless signals and thus determine at least one of a network operator identity (e.g., public land mobile network (PLMN), a mobile network code (MNC) and associated mobile country code (MCC)), a cell site identity (e.g., a cell global identity (CGI) or macro sector identifier. In an aspect, the identifier can be a numeric index that characterizes a pilot code sequence, e.g., a Zadoff-Chu sequence, or an M-sequence. In addition, scanner component 220 can gather data on DL signal strength and quality associated with identified cell or sectors and related networks. To at least that end, scanner component 220 can collect DL reference signal(s) 262 and analyze such signal(s) to determine DL channel quality or strength. In an aspect, signal strength can be determined through received signal strength indicators (RSSIs) or received signal code power (RSCP), while quality can be assessed through metrics such as signal-to-noise ratio (SNR), signal-to-noise-and-interference ratio (SNIR), or energy per chip over total received power ($E_c/N_0$). Moreover, scanner component 220 also can gather uplink (UL) data originated at a mobile device, e.g., 104. In an aspect, scanner component 218 can decode collected UL data to extract a unique identifier of the mobile device. Decoded unique identifier(s) can include an international mobile subscriber identity (IMSI), temporary IMSI (TIMSI), an international mobile equipment identifier (IMEI), a mobile directory number (MDN), a mobile identification number (MIN), a Telecommunications Industry Association (TIA) electronic serial number (ESN), or a multi-bit identification number like the mobile identity number (MEID). Data collected by scanner component 220 can be retained in data storage 254.

Scanner component 220 also can decode UL or DL subscriber traffic at femtocell AP 202. As described supra, subscribers that access wireless service through one or more femtocell $110_1$-$110_N$ agree to have traffic monitored as part of wireless service provision within the indoor confined area.

Decoding performed by scanner component 220 can be based at least in part on blind decoding of received signal(s), computation of log-likelihood ratios (LLR) associated with constellation realization for a specific demodulation; maximum likelihood (ML) estimation, minimum mean square equalization (MMSE), zero forcing (ZF) filtering, or maximal ratio combining (MRC) filtering. To determine code sequences and thus one or more of the foregoing identities or identifiers, scanner component 220 can compute cross-correlation of decoded signal(s) and a set of code sequence hypotheses for the various radio technologies included in the set of technologies surveyed by scanner component(s) 212. Code sequences can include at least one of a scrambling code, a pseudonoise (PN) sequence, a chirp-like sequence, and so forth. Code sequence hypotheses can be retained in memory element 254.

In an aspect of the subject innovation, the described scanning of wireless environment neighboring a transmission point can be exploited to effect service domination as follows. Femto AP $110_\lambda$, which is embodied in femto AP 202 and provides at least part of coverage to a confined restricted area, can identify a set of dominant external control channels delivered in accordance with one or more radio technology protocols, and deliberately transmit a frequency carrier that overlaps the identified channel(s). Femto AP $110_\lambda$ identifies such external control channels through the previously described scanning. Such selective spectral overlap embodies selective jamming that allows the femtocell AP to dominate, at least in part, control activity within the indoor restricted area and thus dominate indoor coverage without having to jam all spectrum including non-control channels. Since such selective jamming blocks external control channels, deployed femtocell APs (e.g., $110_1$-$110_N$) provides the only useable control signaling. Accordingly, the selective jamming forces all mobile device(s) near transmission point(s) to camp strictly on deployed femtocell access point(s).

In embodiment 200, femto AP 202 includes a radio control node 224 that can manage available radio resources; such management is effected without increasing processing load in administration component 120. Processor(s) 240 can enable, at least in part, such management. RC node 224 includes a scheduler component 226 that can allocate radio resources such as transmission time(s), packet format(s), code rate(s), frequency carriers, transmit power, or the like. Scheduler component 226 can receive an indication of a set of identified external control channels and allocate a set of femtocell frequency carriers to be delivered in the spectral region in which the identified external control channels propagate. In an aspect, as part of allocation of the set of frequency carriers, RC node 224, via at least in part scheduler component 226, can adjust frequency of the carriers in the set of femtocell frequency carriers to ensure overlap with frequency(ies) of the set of identified external control channels. To at least that end, RC node 224 can tune one or more clock sources (not shown) in femtocell AP 202 to shift the frequency of an available femtocell carrier generated within a first EM frequency band, such as one of EM frequency bands indicated supra, in which femtocell AP 202 radiates so as to overlap with the frequency of an external control channel transported in a second EM frequency band, such as one of EM frequency bands indicated supra. Femtocell frequency carriers can be red-shifted, e.g., downconverted, or blue-shifted, e.g., upconverted, to match frequency of external control channels; for a specific frequency of an external control channel, downconversion or upconversion can be implemented in one or more discrete increments (e.g., 200 KHz) or decrements (e.g., 200 KHz) that adjust the center frequency of the femtocell carrier. In addition, scheduler component 226 can grant transmit power for each carrier in the allocated set of frequency carriers. In an aspect, scheduler component 226 can determine transmit power for each carrier through various models and related simulations; for instance, scheduler component 226 can exploit Orthogonal Carrier Noise Simulation (OCNS) to generate a set of transmit (TX) power allocation(s) that can dominate, e.g., transmit maximum energy within, 5 Mhz of EM spectrum regardless of served call traffic.

Figure 3:
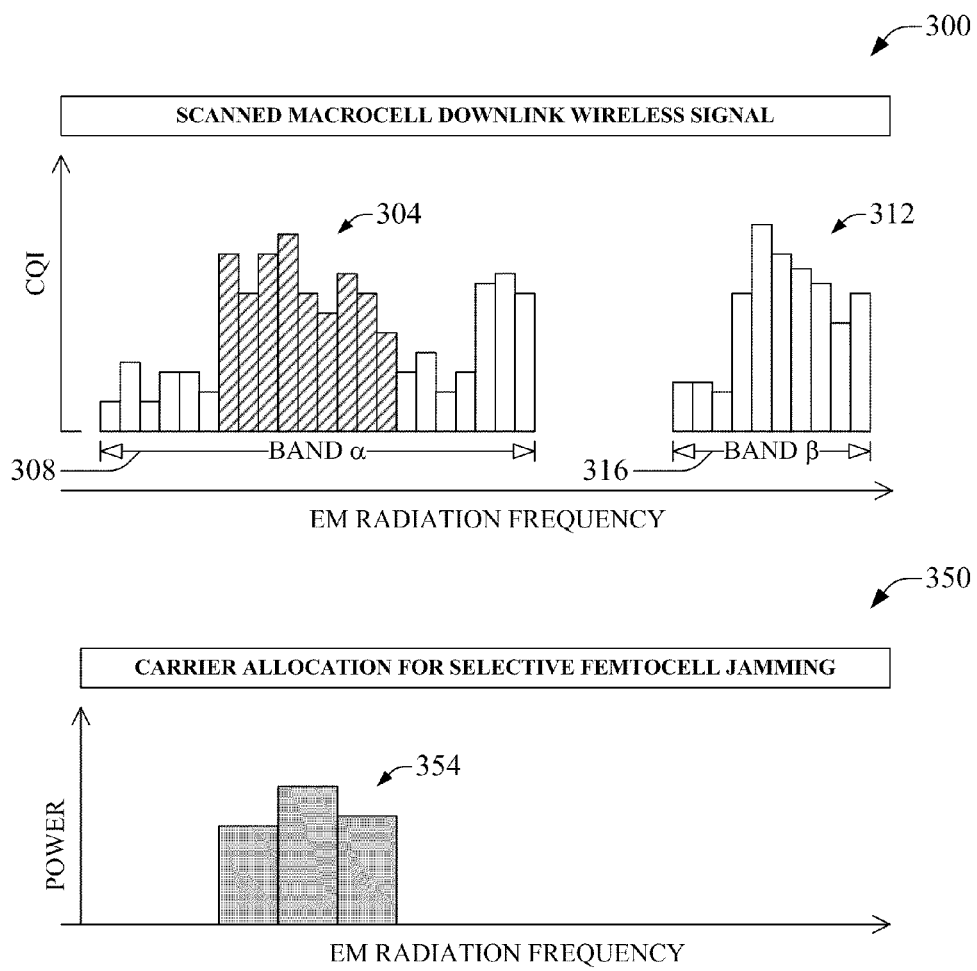
FIG. 3 displays diagrams of strength of scanned macrocell downlink wireless signal and power allocation of frequency carrier(s) for selective femtocell jamming in accordance with aspects described herein.

In an aspect, number and spectrum spread of detected DL control channels can determine number of femtocell frequency carriers that are to be scheduled and transmitted to dominate wireless resources within a confined coverage area; see, as an illustration, FIG. 3. Example diagram 300 displays channel quality indicator (CQI) of channels detected in macrocell DL wireless signal in two illustrative EM frequency bands: band α 308 and band β 316. In diagram 300, detected non-control channels are illustrated with open bars whereas control channels (e.g., broadcast control channel (BCCH)) are illustrated as dashed bars; in particular a set 304 of nine control channels is displayed in band α 308. As illustrated in diagram 350, spectral bandwidth of frequency carriers available to femtocell APs within confined restricted area can be such that a set 354 of three such carriers fully overlap the spectral spread of detected control channels in set 304. It should be appreciated that generally the femtocell frequency carriers can exceed the spectral bandwidth of detected DL control channels. As indicate hereinbefore, femtocell frequency carriers in example set 354 have disparate allocated transmit powers; such power is allocated as indicated supra and it is sufficient to block or substantially block reception of control channels in set 304. It should be appreciated that FIG. 3 also depicts the selectivity of jamming as described herein; for instance, since control channels are not detected in band β 316, frequency carriers available for femtocell communication are not allocated in frequencies in such band.

As described supra, access to wireless service within confined area in which example system 100 operates is restricted. In embodiment 200, femto AP 202 includes access manager component 228 that validates credential(s) (e.g., IMSI) of a mobile device that attempts attachment with transmission point(s) (not shown) linked to femto AP 202. In an aspect, scanner component 220 can extract such credential(s) through decoding of UL attachment signaling and supply them to access manager component 228, which checks the credential(s) against access control list(s) (ACL(s)) 246. If received credential(s) of the mobile device are matched with an identified mobile number in ACL(s) 246, attachment procedure (e.g., LAU) is completed and the mobile device is allowed to camp in femto AP 202 and establish emergency and non-emergency calls sessions. Conversely, if the received credential(s) do not match a configured mobile number in ACL(s) 246, access manager component 224 rejects the attachment signaling, e.g., delivers a LAC reject signal in response to LAU attempt, and the mobile device is allowed to make emergency calls only.

Figure 4:
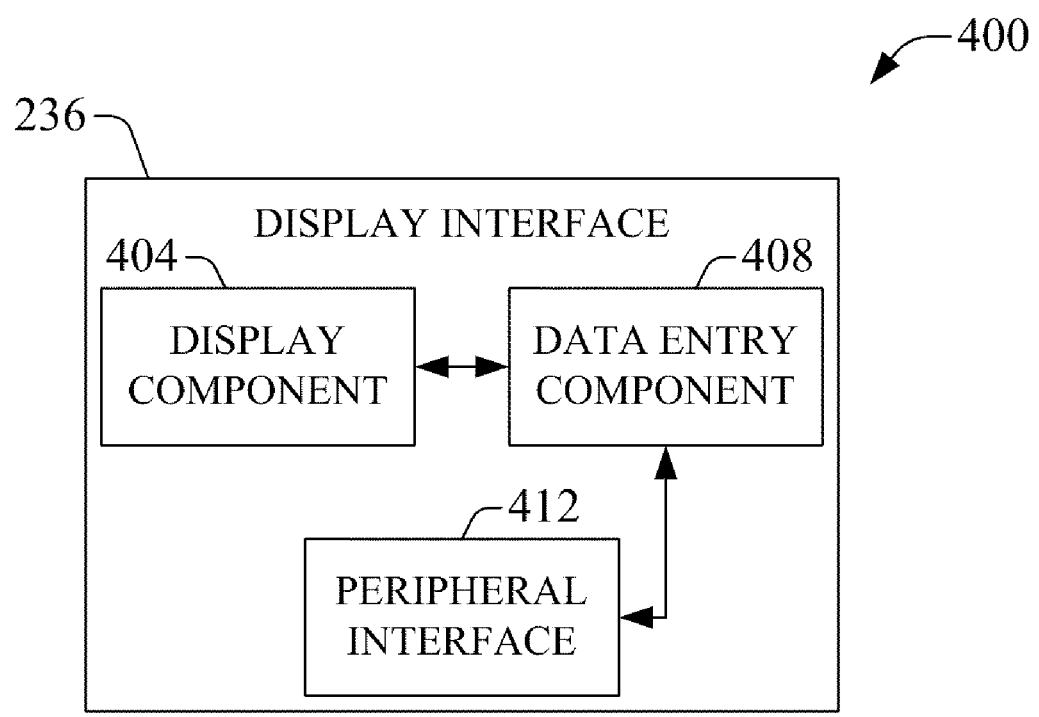
FIG. 4 presents an example embodiment of a display interface within a femtocell access point in accordance with aspects described herein.

In embodiment 200, femto AP 202 also includes display interface 236, which can render various indicia associated with functions that control operation of femto AP 202 or reveal operation conditions thereof, e.g., available connectivity to backhaul broadband network. In addition, display interface 236 can convey information to an end user, such as number of currently served mobile devices. Information can be conveyed via visual or aural indicia, which can also be employed in connection with messages that convey operational instructions to an end user from a network component such as an IVR server or a customer representative terminal. In an example embodiment of display interface 218, see FIG. 4 display component 404 can render prompt(s) or other content(s) associated with leasing a mobile device; to at least such end, display component 404 can convey visual or aural indicia. Various schemes can be employed to render the prompts or other content(s) such as, but no limited to, windows-based schemes, e.g., iconic representation, pop-up representation; or text-based representation, with scroll-down or scroll-sideways delivery, or static rendering. In addition, the prompts or other content(s) can be organized in various configurations within a rendering area (e.g., display screen) that can be a part of display component 404. In an aspect, display component 404 can be embodied, at least in part, in a display element within a monitor such as a cathode ray tube (CRT) monitor, a Liquid Crystal Display (LCD) monitor, a plasma monitor, a light emitting diode (LED) monitor, an electrochromic monitor, or the like. Display component 218 also can enable communication of aural indicia; for example, via speaker(s).

Display interface 236 also allows entry of data that can enable femto AP 202 to receive external commands (e.g., restart operation) or configuration information (e.g., edit ACL(s) within femto AP 202 or in administration component 120). Display interface 236 can process (e.g., decode/code), at least in part, received input and convey it as signaling to one or more functional elements (component(s), platform(s), etc.) or memory 244 within femto AP 202. To mitigate fraudulent transaction(s), entry of data can be secured through various credential-based mechanisms, such as password protection, biometric protection, or the like, and associated secured transport protocol(s) that can include data encryption. In an aspect, code instructions that can be executed to implement such mechanisms can be retained within application (app.) storage 248. In one or more embodiments, e.g., 400, display interface 236 includes data entry component 408 that enables input of information.

Various functional elements and associated circuitry that can embody, at least in part, data entry component 408 enable data input through one or more gestures (e.g., touch, speech, motion), one or more communication protocols. Such functional elements can include a keypad, a touch screen, a microphone, a camera(s); a bar code reader, radio frequency ID (RFID) reader, infrared (IR) wireless-based reader; or the like. In addition, data entry component 408 also can be functionally coupled to peripheral interface 412 that enables connection to a peripheral device and communication therewith. As an example, peripheral interface 412 can allow connection of an external antenna to receive global navigation data, e.g., global positioning system (GPS) data; the antenna can reside in an outer location of confined restricted area in which example system 100 is deployed, so the antenna is exposed to open sky. As another example, peripheral interface 412 can enable connection to disparate femto AP(s). In an aspect, peripheral interface 412 can include a set of ports, which comprises at least one of parallel ports, serial ports, Ethernet ports, V.35 ports, X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394.

Femto AP 202 includes processor(s) 240 which can be configured to provide or that can provide, at least in part, functionality to substantially any or any component(s), platform(s), interface(s), node(s), and so forth, within femto AP 202 in accordance with one or more aspects of the described operation of femto AP 202. Processor(s) 675 is functionally coupled to each functional element within mobile device 602 and to memory 685 through bus 695, which can be embodied in at least one of a memory bus, a system bus, an address bus, a message bus, or one or more reference link(s) or interface(s). In embodiment 200, processor(s) 240 is illustrated as external to the various functional elements (e.g., component(s), interface(s), platform(s), node(s)) of femto AP 202; however, in additional or alternative embodiment(s), processor(s) 240 can be distributed amongst a plurality of such functional elements. In some embodiment(s), one or more functional elements that comprise femto AP 202 can reside within memory 240 as one or more sets of code instructions that, when executed by processor(s) 240, implement the various functional elements and described functionality thereof.

Processor(s) 240 also can supply information to and retrieve information from memory 244. Such information can enable, at least in part, operation of and/or can provide, at least in part, functionality to communication platform 204, and at least a portion of functional elements therein; scanner component 220; RC node 224 and component(s) therein; display interface and functional element(s) therein; as well as other operational components (not shown) of femto AP 202. The information can include at least one of code instructions, code structure(s), data structures, or the like.

Processor(s) 240 can execute code instructions stored in memory 244, for example within app. storage 691, or other memory(ies) functionally coupled to mobile device 602, to provide, at least in part, the described functionality of femto AP 202. Such code instructions can include program modules or software or firmware applications that implement various methods described in the subject specification and associated, at least in part, with functionality or operation of femto AP 202.

Memory 244 also can retain, at least in part in application storage 248, at least one of data structures (e.g., objects, classes, metadata); code structure(s) (e.g., modules, procedures) or instructions; or substantially any type of software or firmware application(s) that processor(s) 240 can execute to provide, at least in part, functionality associated with substantially any or any component(s), platform(s), interface(s), or functional element(s) within femto AP 202 in accordance with aspects described herein. In addition, memory 244 can store network or device information, e.g., within data storage 248 or credential storage 250, such as encoded pilot signal(s) (e.g., LAC 252); one or more communication protocol(s) or technical specification(s); code sequences for scrambling or spreading; blind decoding hypotheses; semi-persistent scheduling parameters; frequency offsets, macrocell and femtocell identifiers (IDs); address book(s); or the like. Moreover, memory 244 can retain content(s) such as multimedia files or subscriber-generated data. Furthermore, memory 244 can retain, e.g., within credential storage 250, security credentials (e.g., passwords, encryption keys, digital certificates, biometric keys such as voice recordings, iris patterns, fingerprints, deoxyribonucleic acid (DNA) profiles); hardware identifying tokens or codes such as at least one of an IMSI, a temporary international mobile subscriber identity (TIMSI), packet TIMSI (P-TIMSI), an IMEI, an MDN, a MIN, a TIA ESN, or a multi-bit identification number such as MEID. It is noted that memory 244 can include affixed or removable elements such as a subscriber identification module (SIM) card storage, a universal integrated circuit card (UICC) storage, or a removable user identity module (RUIM). In one or more embodiments, at least a portion of memory 244 and content thereof can be external to femto AP 202 and linked thereto via a peripheral interface (e.g., 412).

Figure 5:
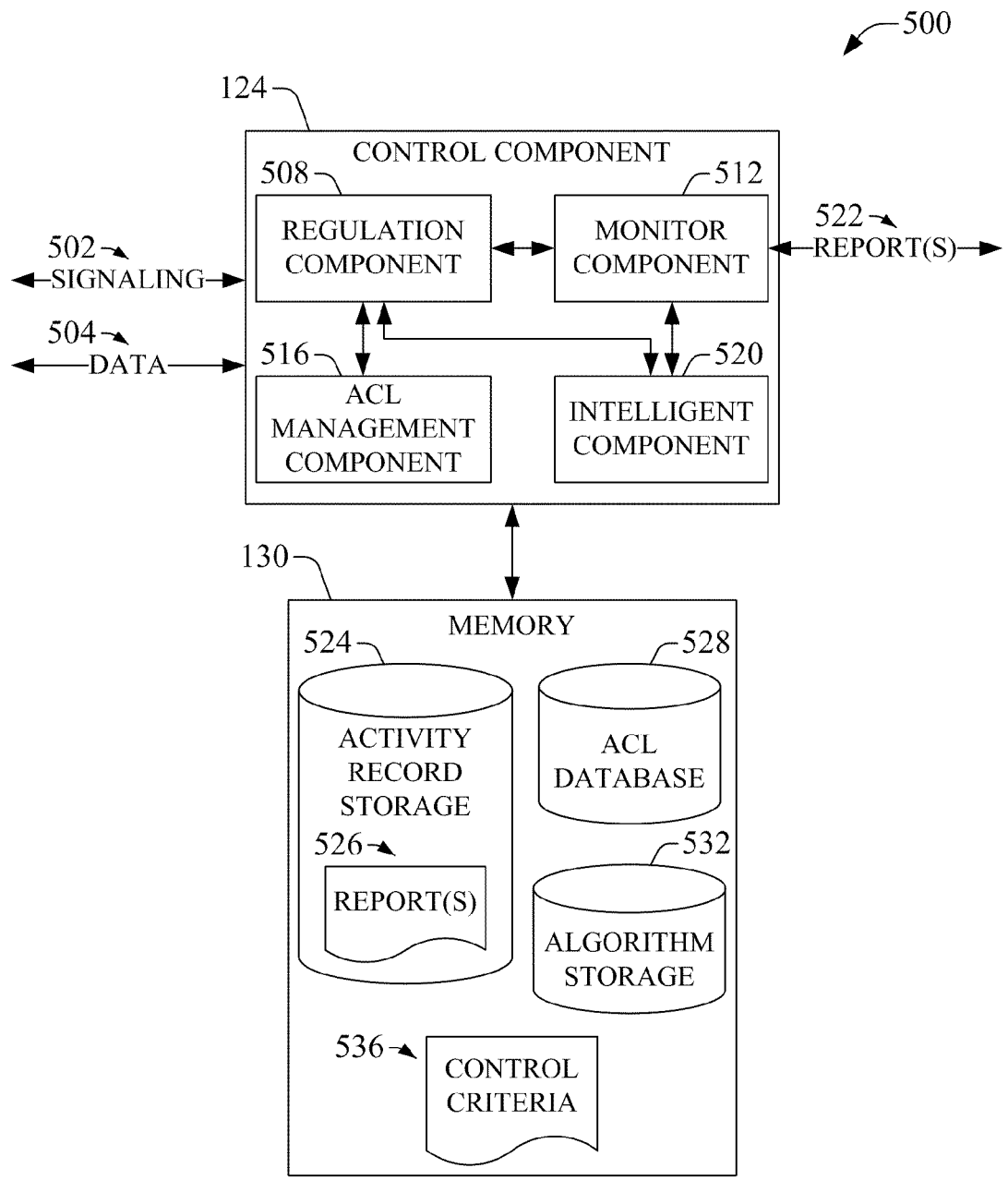
FIG. 5 illustrates an example embodiment of a control component that can operate in an example system that enables regulation of wireless service in accordance with aspects described herein.

FIG. 5 illustrates an example embodiment 500 of control component 124 in accordance with aspects described herein. Regulation component 112 can configure set of EM frequency bands to scan and set of radio technologies. Both sets are readily upgradable and regulation component 112 can update the sets based on specific events or predetermined schedules. Regulation component 112 also can convey scan directive(s) to a femtocell AP (e.g., 110$_N$) to scan wireless environment(s) of one or more transmission point(s). Scan directive(s) can be embodied in multi-bit words (e.g., P-bit words, with P an integer) and coded to specifically convey a request(s) to the femtocell AP to conduct scan operation(s). As described supra, scan directives can be conveyed periodically, with polling rate $\tau^{-1}$, or in accordance to a schedule; regulation component 112 can configure the polling rate or the schedule. To at least that end, regulation component 508 can autonomously determine at least one of the polling rate or the schedule; regulation component 508 also can record the polling rate or the schedule as part of control criteria 536. In the alternative, regulation component 508 can receive at least one of the polling rate or the schedule as part of data 504, and record at least one of the received polling rate or the received schedule as part of control criteria 536.

Autonomous assignment of at least one of suitable polling rate(s) or schedule(s) is automatic and can be based at least in part on inference of suitable values of $\tau^{-1}$ or set(s) of instants that comprise the schedule(s). An inference—e.g., reasoning and generation of conclusion based upon a set of metrics, arguments, or known outcomes in controlled scenarios—can produced through artificial intelligence (AI) or machine-learning methods. For example, the set of metrics employed to generate the inference can include performance metrics related to telecommunication service within the confined restricted area, which is served by the set of femto APs 110$_1$-110$_N$. In particular, the performance metrics can comprise at least one of (1) telecommunication load or capacity of the wireless environment in the confined restricted area, (2) processing load in one or more processor(s) or component(s) within example system 100, (3) bandwidth availability at air interface, or (4) traffic congestion at air interface or wired links (e.g., backhaul 150). In addition, the inference can be produced through optimization of a utility trade-off between the cost of scanning wireless environment of one or more transmission point(s) and the benefit of conducting accurate selective jamming, as described supra; AI methods can be employed to carry out the optimization. Further, such autonomous assignment of at least one of suitable polling rate(s) or schedule(s) can be simplified through introduction of thresholds for the performance metrics associated with telecommunication service within a confined restricted area; the threshold(s) can be retained as part of control criteria 536.

In an aspect, regulation component 508 can exploit intelligent component 520 to carry out the AI or machine learning methods to produce inference(s) or conduct cost-utility analysis and optimization. The artificial intelligence methods or techniques referred to herein typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, incentive generator 1514 can employ one of numerous methodologies for learning from data and then drawing inferences from the models so constructed. Such methodologies can be retained in memory element 1530. As an example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory) and other approaches that perform data fusion or the like, can be exploited.

Regulation component 504 also can determine whether to monitor signaling or traffic generated, at least in part, by an unauthorized device; traffic can include content of voice or data calls, or content of messaging communications (SMS communication, MMS communication, etc.). In addition or in the alternative, monitoring of the unauthorized device can include identification of at least one of device(s) called by the unauthorized device or devices that place a call to the unauthorized device. In an aspect, such determination can be based at least in part on monitoring criteria that can be part of control criteria 536. In an example, the monitoring criteria can include at threshold of unauthorized attachment attempts.

To monitor traffic, regulation component 508 can direct ACL management component 516 to add a UE ID in a set of ACLs associated with a set of respective femtocell APs that are deployed as part of example system 100. Monitor component 218 can collect data and control packets delivered to and from a femtocell AP, and track at least one of traffic or signaling associated with a mobile device, e.g., 104, that operates within the confined restricted area in which example system 100 is deployed. Monitor component 508 can track data and signaling conveyed from femtocell network platform (not shown) directly. However, coded and modulated data delivered by transmission point $140_\lambda$ and received by switch component 122 is conveyed to femtocell AP $110_\lambda$ for processing, decoding and demodulation, and subsequently collected by monitor component 508.

Figure 6:
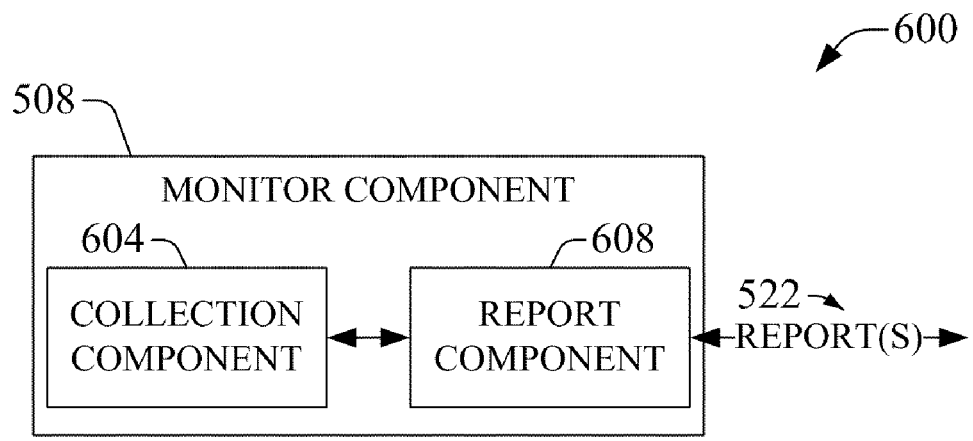
FIG. 6 is a block diagram of an example embodiment of a component that monitors traffic and signaling served in accordance with aspects of the subject innovation.

In an example embodiment 600 illustrated in FIG. 6, monitor component 508 can include a collection component 604 that gathers the foregoing data and control packets or data and signaling, and records the traffic and signaling in memory element 524 for generation of related intelligence. In addition, example embodiment 600 also includes a report component 608 that can generate traffic and signaling intelligence based at least in part on traffic and signaling that is either received from collection component 604 or retrieved from activity record storage 524. In an aspect, report component 608 can aggregate the traffic and signaling in accordance to various reporting strategies, which can be retained in control criteria 536, and produce one or more report(s) 522. In addition, to aggregate the traffic and signaling, report component 608 can exploit intelligent component 520. Aggregation can include data mining, e.g., generation of statistics of attachment including rejection thereof, LAC(s), femtocell AP ID(s), extraction of patterns of attachment signaling or traffic; classification and segmentation such as compilation of traffic and signaling associated with at least one of a specific period, destination of call session(s), duration thereof; or the like. One or more methods or algorithms for aggregation can be retained in algorithm storage 532, and can include at least one of the AI methods indicate supra.

To locate a mobile device, e.g., 104, within a confined restricted area, in an aspect of the subject innovation, regulation component 504 can instruct one or more femtocell APs $110_\lambda$ to modulate transmit (TX) power of one or more transmission point(s) associated thereof, and instruct monitor component 508 to track attachment signaling directed to a set of the one or more femtocell APs; the set can include all or a portion of the one or more femtocell APs. In an aspect of monitoring, to track the attachment signaling, monitor component 508 receives information from the one or more femtocell APs. In an embodiment, e.g., 600, collection component 604 can receive the information, which can be relayed to report component 608 for aggregation and report generation.

Modulation of TX power effected by the one or more femtocell APs includes decrements and increments to transmit power of each antenna in the one or more transmission point(s); the increments and decrements are determined by a specific sequence, which can be stored in control criteria 536. Such modulation can cause a mobile device, e.g., 104, within wireless environment(s) of the one or more transmission point(s) to halt delivery of attachment signaling to a first femtocell AP with low TX power and search for a second femtocell AP that transmits at higher power. Typically, the second femtocell AP radiates through transmission point(s) that are nearest neighbor(s) to transmission point(s) through which the first femtocell AP radiates. As described above, since distribution of transmission point(s) throughout the confined restricted area is such that nearest-neighboring transmission point(s) can deliver disparate LAC(s) than a reference transmission point, the mobile device, e.g., 104, initiates delivery of attachment signaling to the second femtocell AP. If, as part of TX power modulation, power radiated through transmission point(s) associated with the first femtocell AP increases, the mobile device can re-initiate delivery of attachment signaling directed to the first femtocell AP. If modulation cycle continues with decrement of TX power, the second femtocell AP can detect reiteration of reception of attachment signaling. Accordingly, the first and second femtocell APs can detect reiteration of reception of attachment signaling from the mobile device as a result of transmit power modulation.

The first and second femtocell APs can extract identifier(s) (e.g., IMSI, temporary international mobile subscriber identity (TIMSI), packet TIMSI (P-TMSI), etc.) of the mobile device as part of attachment signaling, and convey the extracted identifier(s) to monitor component 508. In addition, the first and second femtocell AP can notify monitor component 508 if reiteration of attachment signaling is detected. Moreover, through a suitable modulation sequence that turns on and off each transmission point(s) associated with a femtocell AP, the first or second femtocell AP can identify antenna(s) in the set of distributed antennas that reside within transmission point(s) linked to the first and second femtocell APs that causes reiteration of unauthorized attachment signaling. The first of second femtocell APs can convey the identity of the antenna(s) to monitor component 508.

In response to received indication of the foregoing antenna(s) identity(ies), monitor component 508 can generate and deliver a "location" alarm that conveys a likely location of the mobile device, e.g., 104; the likely location is within the coverage area of transmission point(s) associated with the identified antenna(s). The alert message can be at least one of a call (voice or data) or a message communication (e.g., a short message service (SMS) communication or a multimedia messaging service (MMS), or an unstructured supplementary service data (USSD) code). Features of the location alarm such as recipient or destination, content(s), application of retry delivery cycles, or the like, can be established through alarm criteria that can be part of control criteria 536.

Figure 7:
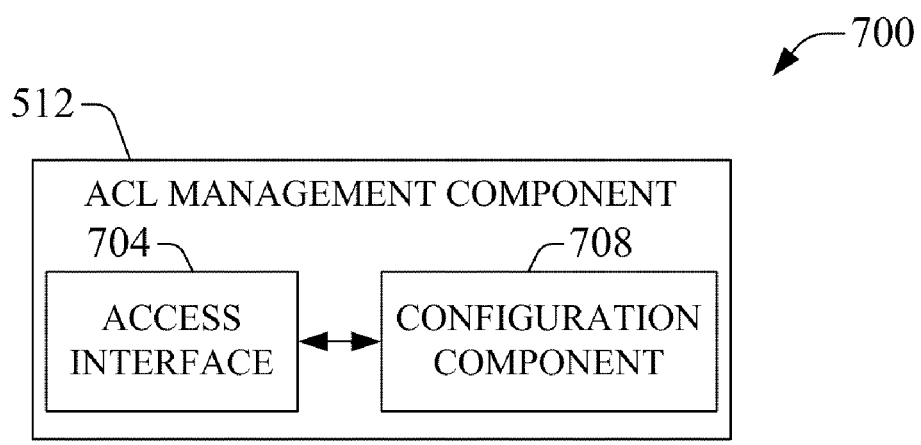
FIG. 7 is a block diagram of an example embodiment of an access control list (ACL) management component in accordance with features of the subject innovation.

With respect to control of access to telecommunication service, access control list (ACL) management component 512 can generate and manipulate ACL(s). As described supra, generation of an ACL can occur at a time of provisioning a femtocell AP within example system 100. In an aspect, regulation component 504 can receive an indication the femtocell AP is provisioned as part of set of femto APs $110_1$-$110_N$. In response to such indication, regulation component 504 can direct ACL management component 512 to generate an ACL and supply the generated ACL for provisioning the femtocell AP. The generated ACL can be supplied as part of data 504, and retained in ACL database 528. In an example embodiment, illustrated in FIG. 7, configuration component 708 can generate the ACL and supply it for provisioning in a femtocell AP; configuration component 708 also can record the generated ACL in ACL database 528.

To manipulate an access control list (ACL) management component 512 can exploit manipulation criteria, which dictate instance(s) in which an ACL is to be updated, as described supra. Manipulation of ACL(s) includes at least one of (i) inclusion or exclusion of mobile device identifiers (e.g., IMSI, MSISDN), or (ii) configuration, e.g., addition, deletion, edition, of attribute fields in the ACL(s) that control logic of granted telecommunication service. At least one of an updated ACL for provisioning in a femtocell AP or update(s) to an ACL local to a femtocell AP can be conveyed as part of data 504. In an embodiment, e.g., 700, configuration component 708 can access the manipulation criteria in memory element 536, update the ACL and record the updated ACL in ACL database 528; configuration component 708 also can supply the updated ACL for provisioning in a femtocell AP. Manipulation criteria can be retained as part of control criteria 536. In addition, ACL management component 516 can convert a customary mobile directory number (MDN) or MSISDN to other identification code(s) or token(s) such as IMSI, IMEI, MIN, TIA ESN, or a multi-bit identification number, e.g., MEID. Such conversion can be implemented for utilization at various levels within a serving network (not shown).

As described supra, manipulation of an ACL can be effected interactively, at least in part via, for example, terminal 170 and AN(s) 160. To at least that end, control component 124 can receive a request to configure an ACL. In an aspect, the request can be received as part of signaling 502 and processed by regulation component 508. The request can identify a requestor and regulation component 508 can determine ACL configuration privileges of the identified requestor; such privileges can be retained as part of control criteria 536. Based at least in part on the ACL configuration privileges, regulation component 508 can grant or decline the request. If the ACL configuration privileges of the requestor allow changes to the ACL, regulation component 508 grants the request and directs ACL management component 516 to implement the request. Conversely, if the ACL configuration privileges do not allow the requestor to configure an ACL, regulation component 508 can decline the request. In an embodiment, e.g., 700, ACL management component 516 can include an access interface that enables interactive delivery of at least one of UE ID(s) to be included in an ACL or associated access profile attributes. Access interface 704 can provide an update environment, collect data (e.g., mobile device identifier(s) or manipulation commands), and relay the data to configuration component 708 which can effect the update.

Figure 8A:
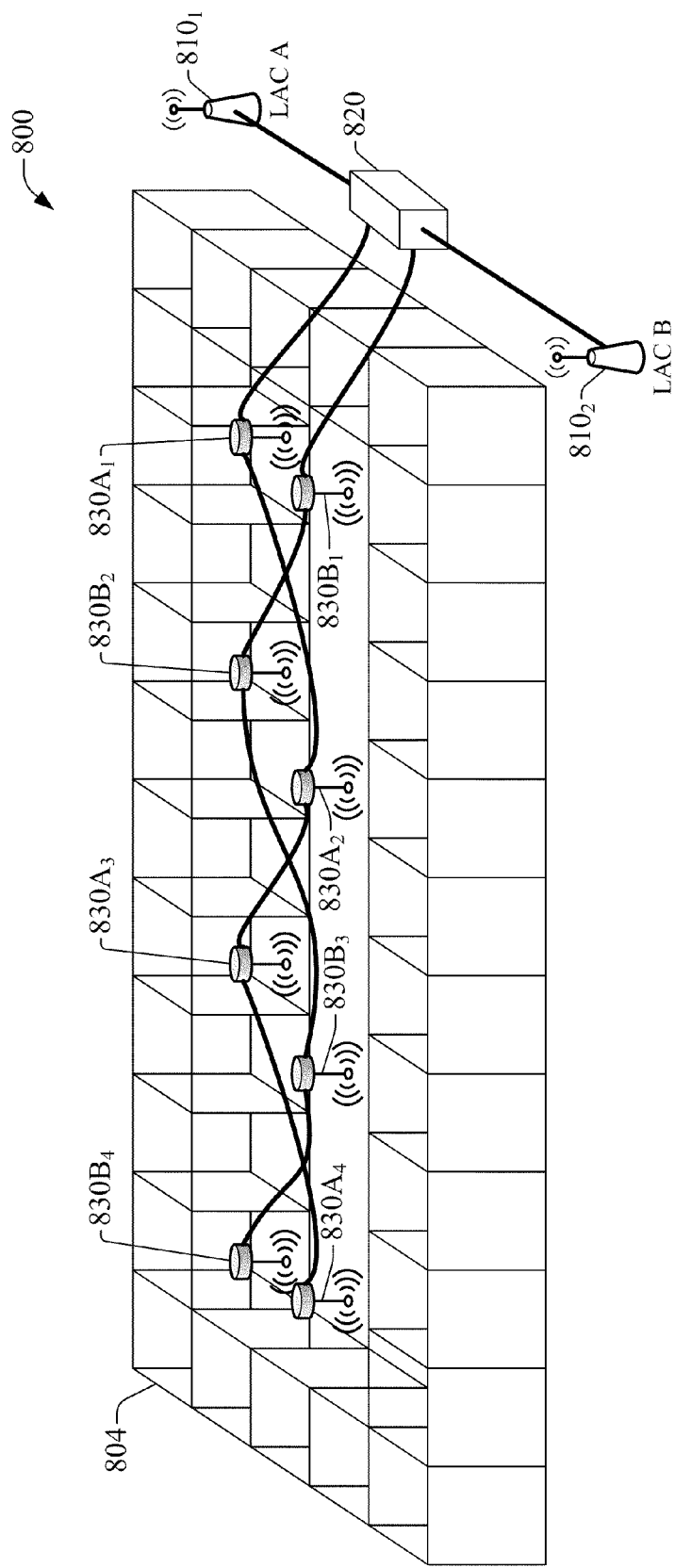
FIGS. 8A-8B illustrate, respectively, a perspective view and a top view of an example confined area wherein telecommunication is restricted and served through illustrative two femtocell APs and respective sets of four transmission points.
Figure 8B:
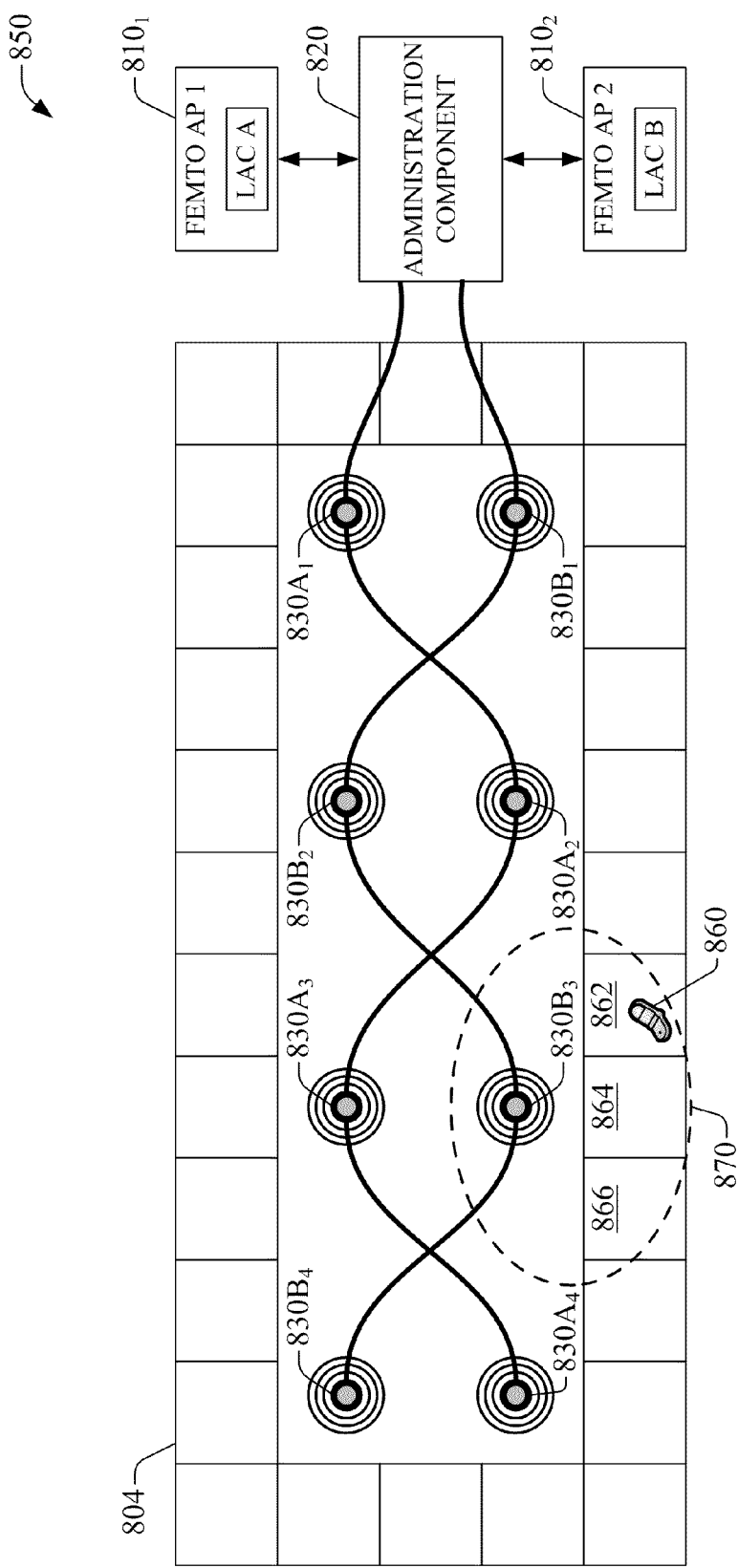

FIGS. 8A-8B illustrate, respectively, a perspective view 800 and a top view 850 of an example confined area wherein telecommunication is restricted and served through illustrative two femtocell APs and respective sets of four transmission points. Confined area 804 includes a set of 30 enclosures, which can be closed, open, or semi-open. The set of enclosures can be embodied in one of cells in a correctional facility; at least one of classrooms or administrative offices in an education institution; offices in a business facility; at least one of bedrooms or administrative offices in a hospital; balcony suites in a theater; or the like. Femtocell AP $810_1$ has LAC A and is functionally coupled to the set of four transmission points $830A_1$-$830A_4$, whereas femtocell AP $810_2$ has LAC B, different from LAC A, and is functionally coupled to a set of four transmission points $830B_1$-$830B_4$. Such functional coupling is enabled through administration component 820, which has substantially the same or the same functional elements of administration component 120 and it operates in substantially the same or the same manner thereof. Transmission points in each set are functionally connected in series via a single link (thick line in drawing), which can be a fiber optic link or other type of wired backhaul pipe. Hardware structure that supports transmission points $830A_1$-$830A_4$ and $830B_1$-$830B_4$ is not shown for clarity. Transmission points $830A_1$-$830A_4$ and $830B_1$-$830B_4$ have the same functional structure as one of transmission point(s) $140_\lambda$, and such transmission points operate in substantially the same or the same manner thereof described supra. In an aspect, transmission points $830A_1$-$830A_4$ and $830B_1$-$830B_4$ are located in a portion of a substantially rectangular lattice (also see FIG. 8B) with interleaved LAC assignments, such that nearest-neighbors to a transmission point have different LAC(s) than that of the transmission point.

Figure 9:
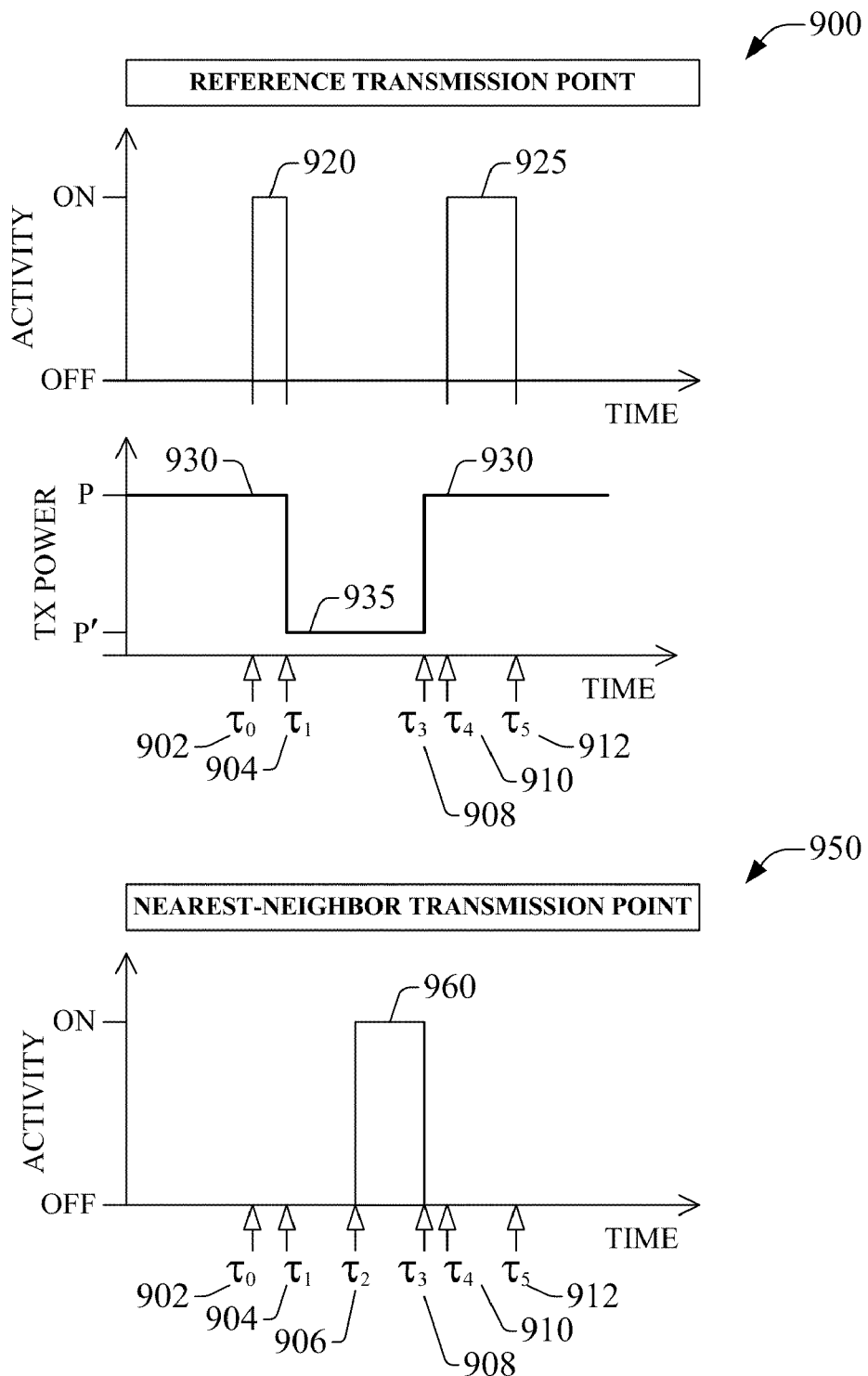
FIG. 9 displays diagrams of femtocell attachment signaling activity and transmit power of a distributed transmission point in accordance with aspects disclosed herein.

In top view 850 of the example system described supra in connection with FIG. 8A, an illicit mobile device 860 is illustrated within an enclosure 862, which receives wireless signal(s) from neighboring transmission point $830B_3$. Enclosures 864 and 866 are also within wireless coverage area 870 spanned by transmission point $830B_3$. The two sets of transmission points $830A_1$-$830A_4$ and $830B_1$-$830B_4$ and respective femtocell AP $810_1$ and $810_2$ can facilitate or enable estimation of location of the illicit mobile device 860; larger, more complex wireless service system such as system 100 can facilitate or enable estimation of unauthorized devices. A femtocell AP can effect location estimation of illicit device 860 as described next; FIG. 9, which displays diagrams of attachment signaling activity and transmit power in accordance with aspects disclosed herein, is employed to illustrate such description.

Unauthorized device 860 within enclosure 862 is exposed to transmission point $830B_3$, which emits wireless signal(s) at transmit (TX) power P 930, attempts attachment (e.g., LAU or RAU in UMTS-based technology) to femtocell AP $810_1$ at an instant $\tau_0$ 902, which results in "On" attachment signaling activity for an interval 920. "ON" attachment activity can persist up to instant $\tau_1$ 904, in which TX power of transmitter $830B_3$ is reduced to P' 935, with P'/P<<1 (e.g., P'=0, which indicates transmission point is disabled), and attachment signaling activity is set to "OFF." Subsequently, at instant $\tau_2$ 906, attachment signaling activity in a nearest-neighbor transmission point $830A_3$ emitting wireless signal at nearly power P 930 can switch to ON. The switching ON of attachment signaling at the nearest-neighbor transmission point can be detected at a femtocell AP that serves such neighboring transmission point. Such attachment signaling remains ON until TX power in reference transmission point is restored to P 930 at $\tau_3$ 908. Subsequently thereafter, at $\tau_4$ 910, attachment signaling activity returns to ON at the reference transmission point and persists ON up to $\tau_5$ 912, at which time rejection, e.g., LAC reject, of the illicit mobile device 860 is effected and no further attachment signaling activity occurs at the reference transmission point for a specific, reject period of time. Restoration of attachment signaling activity at the reference transmission point can be detected by a femtocell AP that serves such transmission point.

The foregoing restoration of attachment signaling activity in a reference transmission point, and activation (switch ON) of attachment signaling activity in a nearest-neighbor transmission point, are both absent if the illicit device 860 is not in proximity to the transmission point for which the TX power is modulated, e.g., switched from high value to low value and vice versa. Thus, through TX power modulation at each transmission point in a set of transmission points can identify a reference transmission point. In addition, detection of restoration of attachment signaling at the reference transmission point or activation of attachment signaling at a nearest neighbor transmission point as result of TX power modulation of the reference transmission point can yield an estimated location of illicit device 860 within the bounds of the wireless coverage area associated with the reference transmission point.

In view of the example systems described above, example methods that can be implemented in accordance with the disclosed subject matter can be better appreciated with reference to FIGS. 10-19. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) or call flow(s) may represent one or more example methods described herein in accordance with the disclosed subject matter when disparate entities enact disparate portions of the one or more methods. Furthermore, not all illustrated acts may be required to implement a described example method in accordance with the subject specification. Further yet, two or more of the disclosed example methods can be implemented in combination, to accomplish one or more features or advantages herein described.

Methods disclosed throughout the subject specification and annexed drawings are capable of being stored on an article of manufacture to enable transporting and transferring such methods to computers or computing devices for execution, and thus implementation, by a processor or for storage in a memory. In an aspect, one or more processors that enact method(s) described herein can be employed to execute code instructions retained in a memory, or any computer- or machine-readable medium, to implement the method(s) described herein; the code instructions, when executed by the one or more processor implement or carry out the various acts in the method(s) described herein. The code instructions provide a computer- or machine-executable framework to enact the method(s) described herein.

Figure 10:
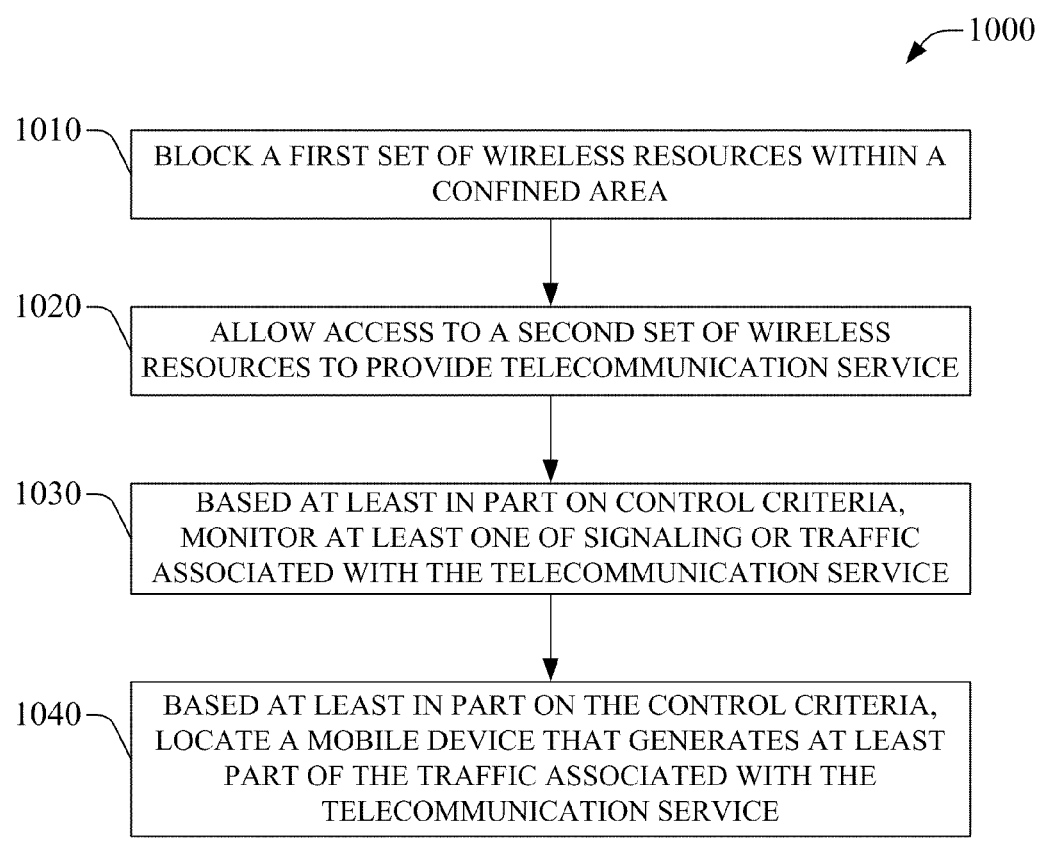
FIG. 10 is a flowchart of an example method for supplying an access control list that administers access to telecommunication service in accordance with aspects described herein.

FIG. 10 is a flowchart of an example method 1000 for regulating telecommunication service in a confined area according to aspects of the subject innovation. The confined area is generally indoors, and telecommunication service is restricted within the confined area. In an aspect, at least one of a set of one or more femtocell APs (e.g., $110_1$-$110_N$), one or more sets of transmission point(s) linked to the set of one or more femtocell APs, or a management component (e.g., administration component 120) can implement, at least in part, the subject example method. In another aspect, one or more processors configured to provide or that provide at least part of the functionality to one or more of the set of one or more femtocell APs, the one or more sets of transmission points linked to the set of one or more femtocell APs, or the management component (e.g., administration component 120) also can enact, at least in part, the subject example method. At act 1010, a first set of wireless resources within the confined area is blocked. In an aspect, the wireless resources in the set are blocked to a mobile device that ingress in the confined restricted area and can be served by one or more macro base stations (e.g., 160). The first set of wireless resources includes at least a set of control channels conveyed by one or more macro base stations external to the confined area. Blocking the wireless resources includes supplying (e.g., generating, delivering, relaying . . . ) signal(s) that prevent or negate reception of control channels transmitted by one or more base stations that serve an area external to the confined area.

Figure 12:
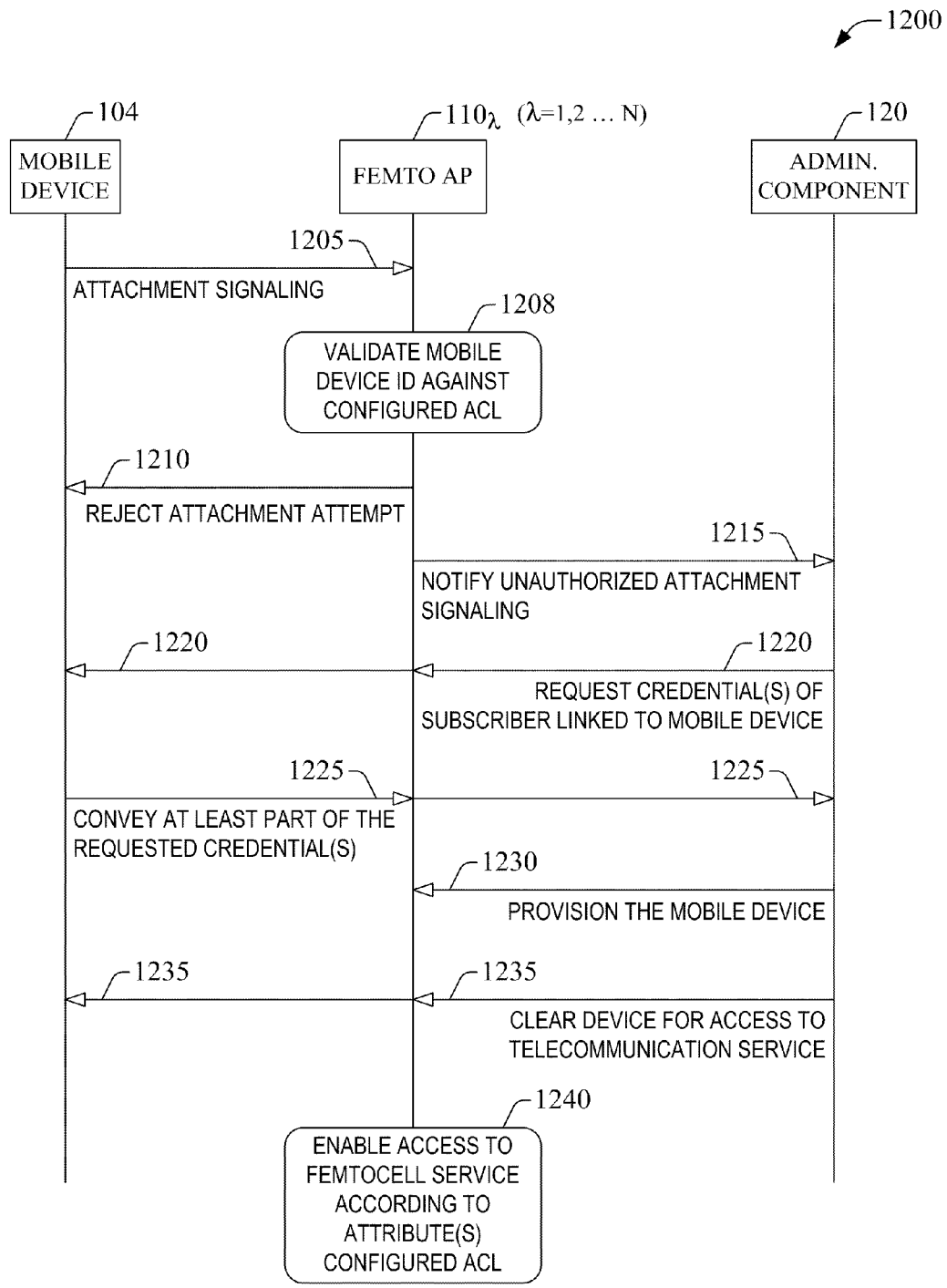
FIG. 12 presents a call flow of an example method for activating access of a mobile device to wireless service within a confined restricted area according to aspects described herein.
Figure 13:
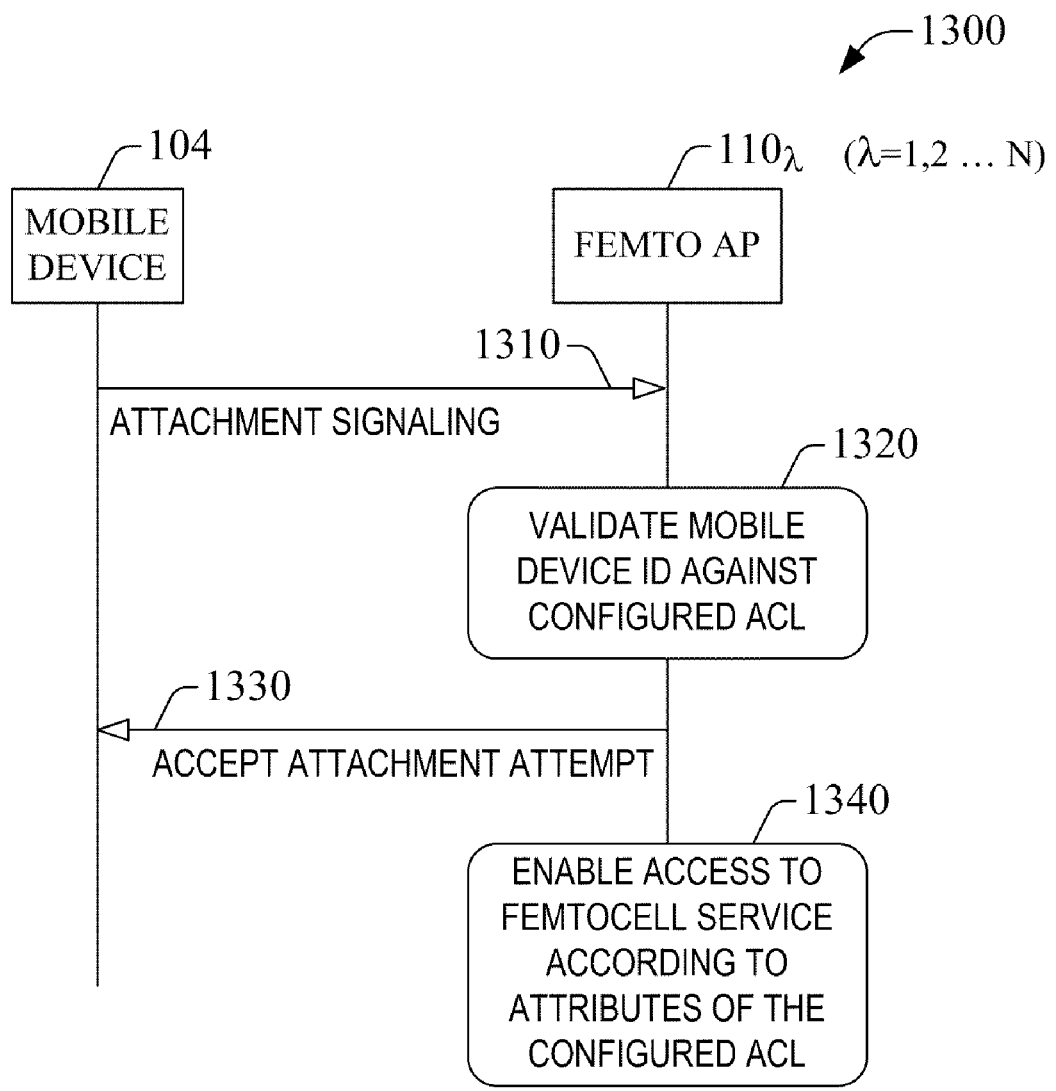
FIG. 13 presents a call flow of an example method for accessing a femtocell access point that supplies wireless service within a confined restricted area according to aspects described herein.

At act 1020, access to a second set of wireless resources to provide telecommunication service is allowed. The second set of wireless resources include at least one of control channels delivered through a transmission point in the one or more sets of transmission points, or data channels or frequency carriers that can transport user or subscriber traffic (e.g., voice). In an aspect, allowing access can be afforded through a femto AP in the set of one or more femtocell APs and the management component. As described supra, allowing access to the second set of wireless resources includes verification of mobile device credential(s) against an access control list. In addition, allowing access includes supplying at least one of control signaling or access clearance indication(s) to an allowed mobile device. FIGS. 12-13 describe further details related to the allowing access act.

At act 1030, based at least in part on control criteria, monitor signaling and traffic associated with the telecommunication service. An aspect of control criteria allows monitoring of traffic of mobile devices that are allowed access to the second set of wireless resources, whereas monitoring of signaling can implemented for substantially any device that moves throughout the confined restricted area. Another aspect of control criteria is that a mobile device that is not allowed access to the second set of wireless resources can be temporarily allowed access for the purpose of lawful surveillance of traffic associated with telecommunication service (e.g., voice calls, data calls, messaging service(s) . . . ). At act 1040, based at least in part on the control criteria, locate a mobile device that generates at least part of the traffic associated with the telecommunication service.

Figure 11:
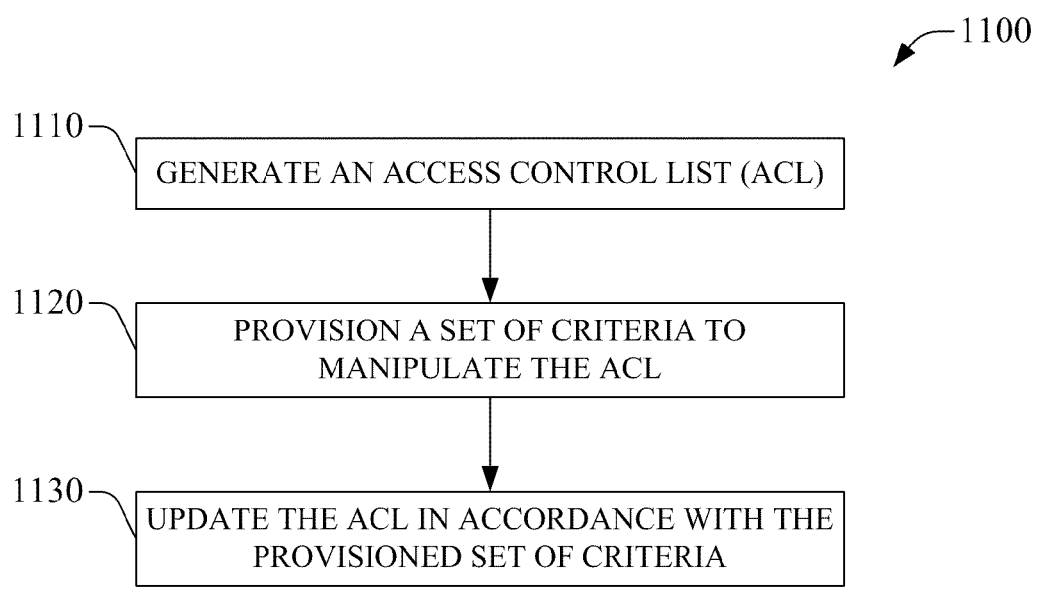
FIG. 11 is a flowchart of an example method for supplying an access control list that administers access to telecommunication service in accordance with aspects described herein.

FIG. 11 is a flowchart of an example method 1100 for supplying an access control list that administers access to telecommunication service in accordance with aspects described herein. In an aspect, supplying the ACL as described in the subject example method can be effected as part of act 1020 described supra. A management component (e.g., administration component 120), or one or more component(s) therein, can implement, at least in part, the subject example method. In the alternative or in addition, one or more processors configured to provide or that provide at least part of the functionality to the management component, or component(s) therein, also can enact, at least in part, the subject example method 1100. At act 1110, an access control list is generated. As described supra, the ACL can be associated with one or more femto APs. An ACL includes a set of field attributes that regulate access to telecommunication service and features of provision thereof via the one or more femto APs. One of the field attributes the ACL identifies mobile number of wireless device authorized to receive telecommunication service through the one or more femto APs to which the ACL is associated. Other field attributes that control service access logic for an identified mobile number also can be part of the ACL. Such service access logic includes at least one of service priority, access schedule or time constraints, access quality of service, forwarding number(s), auto-reply configuration, or the like.

At act 1120, a set of criteria to manipulate the ACL is provisioned. Provisioning the ACL can include generating the set of criteria and committing the set to a memory accessible by component(s) or processor(s) that enact the subject example method. The set of criteria establishes rules to update one or more field attributes within an ACL based at least in part on at least one of spatial constraints, temporal constraints, or interactive requirement(s) (e.g., a UE ID is requested to be entered in an ACL to enable monitoring of traffic generated at or delivered to the UE). In an aspect, spatial constraints can impose changes in an ACL based on region(s) within a confined restricted to which a mobile device lacks clearance to operate (e.g., inside an air control tower). In another aspect, temporal constraints can enforce authorized access to wireless resources within predetermined intervals such as a work shift or duration of an authorized visit into the confined restricted area. At act 1130, the ACL is updated in accordance with the provisioned set of criteria.

FIG. 12 presents a call flow of an example method 1200 for activating access of a mobile device to wireless service within a confined area according to aspects described herein. As indicated supra, telecommunication service is restricted within the confined area. Mobile device 104 is initially unauthorized to access telecommunication resource(s) or service within the confined restricted area. In addition, mobile device 104 can be intended for regular access to the confined restricted areal. For example, mobile device 104 belongs to a new employee of an organization that operates, at least in part, within the confined restricted area, or it belongs to an employee that with new access clearance to one or more secured regions within the confined restricted area. In the alternative, mobile device 104 can asynchronously access the confined restricted area; for instance, in a scenario in which the confined restricted area is a correctional facility, mobile device 218 can access visitor area at non-periodic instances. As illustrated, various functional elements implement aspects of the subject example method 1200: mobile device 218, a femtocell (femto) AP 110$_\lambda$, and administration (admin.) component 120. Alternatively or additionally, one or more processors configured to provide or that provide functionality to each of the foregoing functional elements also can enact, at least in part, the subject example method.

At act 1205, mobile device 810 conveys attachment signaling, the attachment signaling is part of an attachment attempt to femto AP 110$_\lambda$; as indicated supra, in UMTS-based radio technology, attachment signaling can include at least one of LAU or RAU. At 1208, femto AP 1101 validates mobile device 104 ID against a configured access control list (ACL). Since mobile device 104 is initially unauthorized to receive wireless service within the confined restricted area, at act 1210, femto AP 110$_\lambda$ rejects the attachment attempt. In an aspect, rejection of attachment attempt is based at least in part on identification credential(s) of mobile device 104 delivered as part of attachment signaling and access attributes retained in an access control list (ACL) that can be stored within femto AP 110$_\lambda$. The identification credential(s) can include at least one of user equipment (UE) ID, network operator identity (e.g., public land mobile network (PLMN), a mobile network code (MNC) and associated mobile country code (MCC)), or identity of femto AP 110$_\lambda$; the latter ID can include an ESN or a custom code that uniquely identifies such femtocell AP within the confined restricted area. At act 1215, femto AP 110$_\lambda$ notifies unauthorized attachment signaling; as part of the notification, one or more identifying credential(s) (e.g., IMSI) of the mobile device and femto AP 110$_\lambda$ are delivered to administration component 120.

At act 1220, administration component 120 requests credential(s) of at least one of mobile device 104 and subscriber linked thereto; femto AP 110$_\lambda$ relays such request to mobile device 104. The requested credential(s) can include at least one of mobile subscriber ISDN (Integrated Services Digital Network) number (MSISDN); IP (internet protocol) multimedia private identity (IMPI); IP multimedia public identity (IMPU); network operator or provider; subscriber name, time-span of intended access (e.g., visit duration); work schedule or shift if subscriber is an employee of organization that operates within the confined restricted area, or subscriber's acknowledgment of consent to have telecommunication activity (control or traffic) monitored. In an aspect, mobile device 104 can receive at least a portion of the requested credential(s) through one or more gestures (e.g., touch, speech, motion) of a subscriber; a data entry interface within a user-machine interface (e.g., display with touch screen active functionality) that is part of mobile device 104 can cast such input into data.

At act 1225, mobile device conveys at least part of the requested credential(s); femto AP 110$_\lambda$ relays at least the part of the requested credential(s) transmitted by mobile device 104. At act 1230, based at least in part of received credential(s), administration component 120 can provision mobile device 104. In an aspect, if received credential(s) are not satisfactory, e.g., do not include subscriber's consent to have telecommunication activity (control or traffic) monitored, mobile device 104 can be seized for the time-span of access to confined area. Provisioning includes configuring attributes in an ACL associated with femto AP 110$_\lambda$ or other femtocell APs that provide wireless service within the confined restricted area; in an aspect, the configuring act comprises addition of received MSISDN, disclosed time-span of access (e.g., visit, work shift), or network operator or provider into the ACL. Received MSISDN can be included in a UE ID field within the ACL, whereas time-span of access can be included within a profile attribute field associated with the ACL and that controls, at least in part, logic of fulfillment of service for an identified UE in the ACL. At act 1235, administration component 120 can clear the mobile device for access to telecommunication service. Clearing act includes delivering an indication to the mobile device 104 that access to femtocell service is granted; the indication can include a directive to render a unique alphanumeric indicator if mobile device 104 recognizes the LAC for femto AP 110$_\lambda$ while mobile device 218 is camping on it. At act 1240, femto AP 110$_\lambda$ enables access to femtocell service according to configured ACL attribute(s).

FIG. 13 presents a call flow of an example method 1300 for accessing a femtocell access point that supplies wireless service within a confined restricted area according to aspects described herein. In an aspect, in example method 1300, mobile device 104 is cleared or authorized to access telecommunication resource(s) or service within the confined restricted area through femtocell AP 110$_\lambda$. As illustrated, various functional elements implement aspects of the subject example method 1300: mobile device 104, and femtocell (femto) AP 110$_\lambda$. Alternatively or additionally, one or more processors configured to provide or that provide functionality to each of the foregoing functional elements also can enact, at least in part, the subject example method. At act 1310, mobile device 104 conveys attachment signaling, the attachment signaling is part of an attachment attempt to femto AP 110$_\lambda$; as indicated supra, in UMTS-based radio technology, attachment signaling can include at least one of LAU or RAU. At 1320, femto AP 110$_\lambda$ validates mobile device 104 ID against a configured access control list (ACL). Since mobile device 104 is cleared, or authorized, to receive wireless service within the confined restricted area, at act 1330, femto AP 110$_\lambda$ accepts the attachment attempt. At act 1340, femto AP 110$_\lambda$ enables access to femtocell service according to attributes of the configured ACL.

Figure 14:
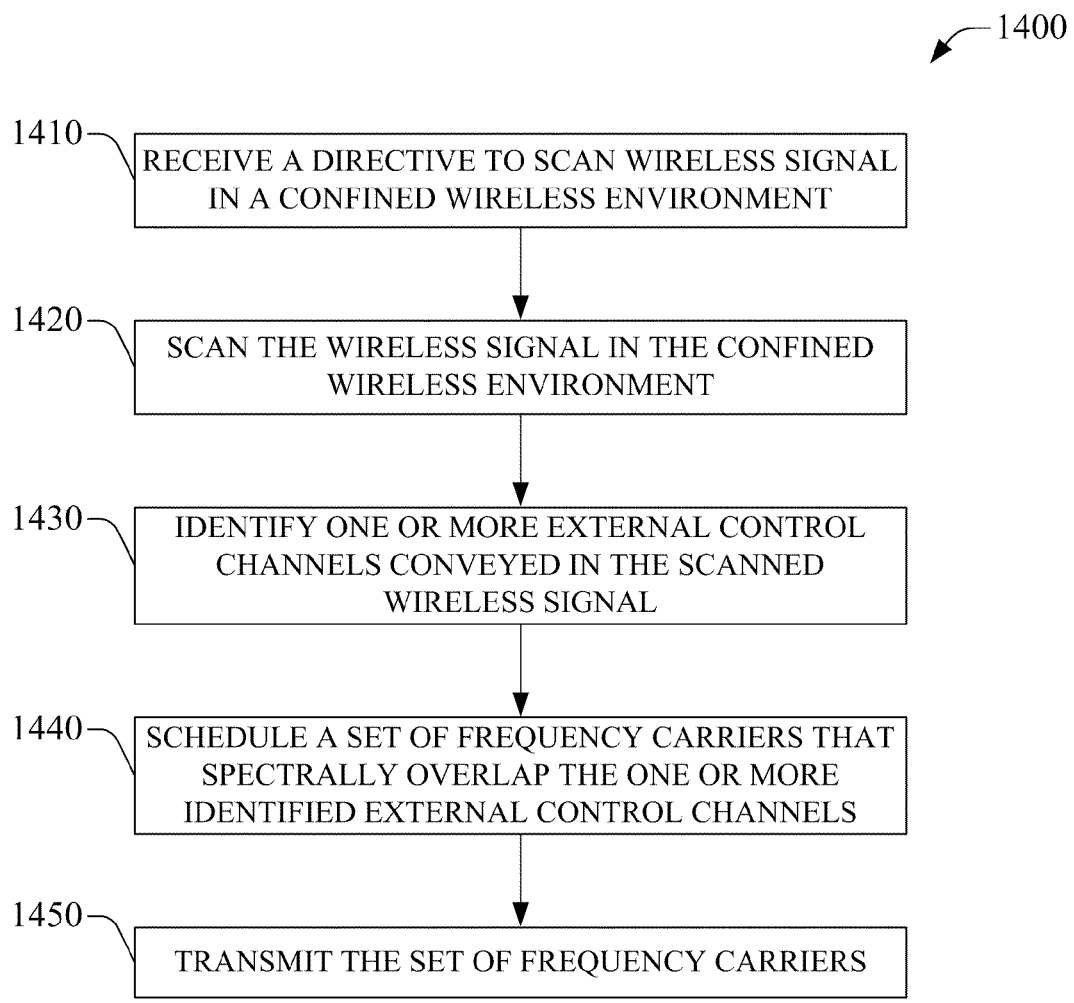
FIG. 14 displays a flowchart of an example method for dominating wireless coverage in a confined location according to aspects described herein.

FIG. 14 displays a flowchart of an example method 1400 for dominating wireless coverage in a confined location according to aspects described herein. The subject example method can be implemented by one or more indoor-based access points, e.g., femtocell AP(s) 110$_1$-110$_N$, or component(s) that control the one or more indoor-based APs and distributed antenna system(s) functionally coupled thereto. Alternatively or additionally, one or more processors can enact the subject example method 1400; the one or more processors can be configured to provide or can provide, at least in part, functionality to the one or more indoor-based access points or components that control the one or more indoor-based access points and distributed antenna system(s) functionally coupled thereto. At act 1410, wireless signal is scanned in a confined wireless environment. The wireless signal can be originated at a set of one or more base stations that serve one or more macrocells. In addition, the wireless signal can be transported in disparate frequency portions of the electromagnetic spectrum, and coded and modulated in accordance with one or more radio technology protocols. The confined wireless environment can be an area in which telecommunication is restricted (see, e.g., FIG. 1).

At act 1420, one or more external control channels conveyed in the scanned wireless signal are identified. The control channel(s) are external with respect to control channel(s) conveyed by a set of one or more access points, e.g., femto AP(s) 110$_1$-110$_N$, that serve the confined wireless environment. Identification can be performed by decoding the wireless signal in accordance with one or more decoding and demodulation hypotheses corresponding to various radio technology protocols. At act 1430, a set of frequency carriers are scheduled, the frequency carriers spectrally overlap the one or more identified external control channels. Scheduling includes establishing the number of elements in the set of frequency carriers based at least in part on the spectral spread of the identified external control channels and the radio technology employed for wireless communication by the one or more indoor-based APs that enact, at least in part, the subject example method. Scheduling also includes allocating transmit power for each element in the set of frequency carriers in order to dominate propagation of the identified external control channels within the confined wireless environment. At act 1440, the scheduled set of frequency carriers is transmitted. As described supra, the transmitting act can include generating the carrier(s) in the set of frequency carriers, delivering the carriers to the component(s) that control the indoor-based APs, and relaying the carriers to transmission points that are part of the distributed antenna system(s) for delivery.

Figure 15:
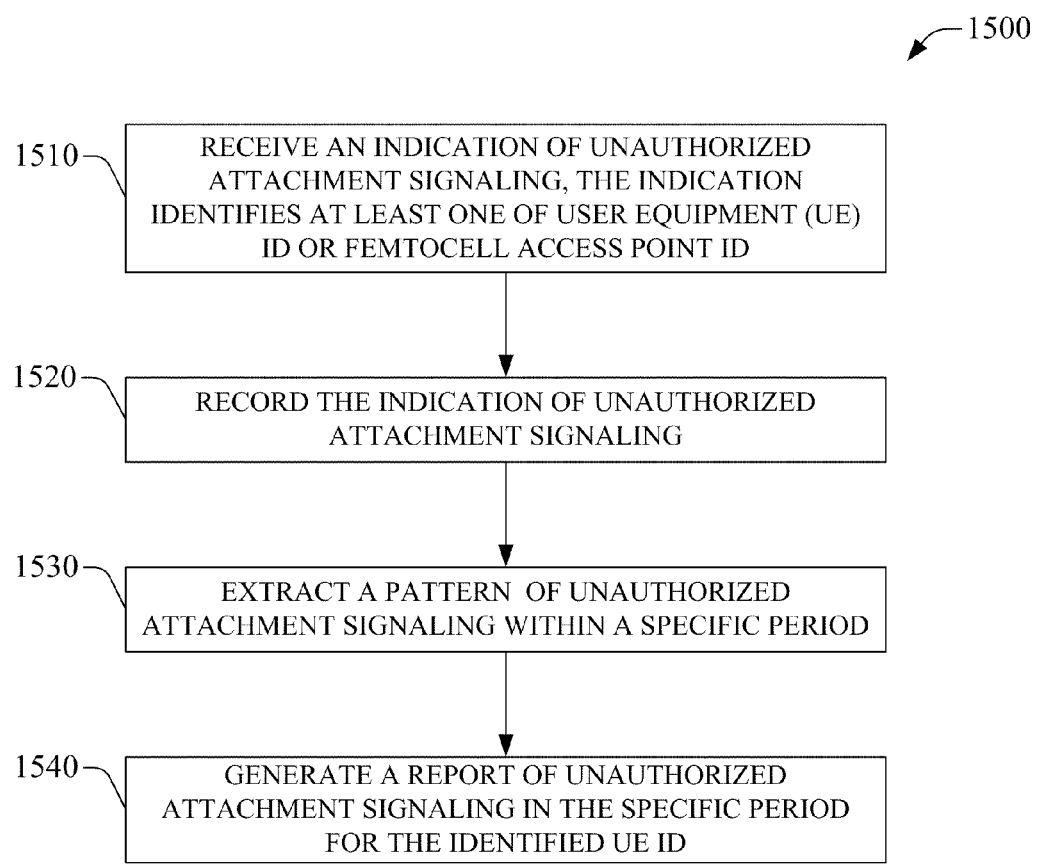
FIG. 15 is a flowchart of an example method for monitoring attachment signaling to a femtocell AP that serves, at least in part, a confined area according to aspects described herein.

FIG. 15 is a flowchart of an example method 1500 for monitoring attachment signaling to a femtocell AP that serves, at least in part, a confined area according to aspects described herein. The subject example method can be implemented by one or more components that control the femtocell AP; for instance, administration component 120 and component(s) therein. Alternatively or additionally, one or more processors can enact the subject example method 1500; the one or more processors can be configured to provide or can provide, at least in part, functionality to the one or components that control the femtocell AP. At act 1510, an indication of unauthorized attachment signaling (e.g., unauthorized LAU signaling) is received, the indication identifies at least one of user equipment (UE) identity (ID) (e.g., IMSI) or femtocell AP ID. Identification can be provided as part of payload data conveyed in the indication. The indication can be received from the controlled femtocell AP. In an aspect, the indication can be embodied, for example, in one or more reserved bits in a packet header, a light-payload (e.g., of the order of 1 byte) data packet, a predetermined multi-bit word conveyed in a control channel, a light-payload file (e.g., a cookie), an email communication, an instant message, or the like.

At act 1520, the indication of unauthorized attachment signaling is recorded. Such recordation can be retained within a memory functionally coupled to the one or more components or processors that can enact the subject example method 1500. At act 1530, a pattern of unauthorized attachment signaling within a specified period is extracted. The specified period can span various time scales such as an hour, 12 hours, a day, or multiple days. In an aspect, an administrator that regulates telecommunication service within the confined area can configure the specified period. In the alternative or in addition, the specified period can be autonomously configured to improve statistical significance of extracted pattern(s).

At act 1540, a report of unauthorized attachment signaling in the specified period is generated for the identified UE ID. The report can include at least one of the identified pattern; location of attachment event(s) and associated mobility data, e.g., time of event and location; or recurrence of attachment events, e.g., frequency of attachment attempts at disparate locations.

Alternative or additional embodiments of method for monitoring attachment signaling to a femtocell AP that serves, at least in part, a confined area, can include an act at which an attachment alarm can be generated and conveyed in accordance with alarm criteria as described supra (see, e.g., FIG. 5 and associated description) if unauthorized attachment signaling is received.

Figure 16:
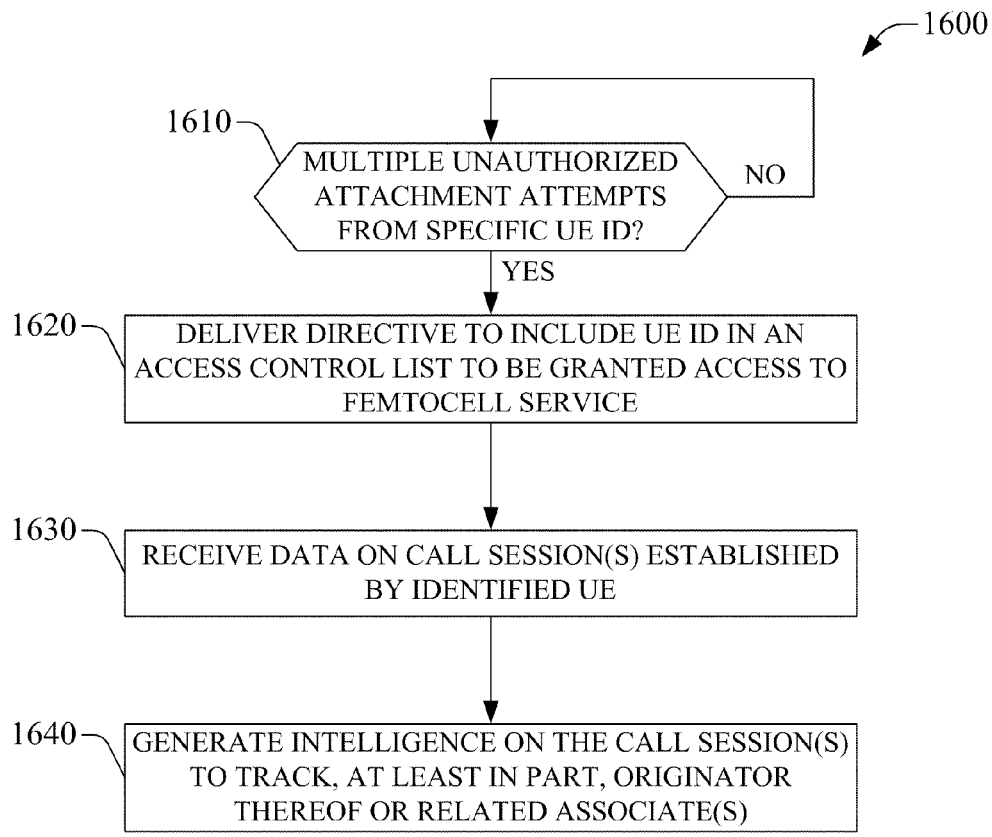
FIG. 16 displays a flowchart of an example method for monitoring traffic originated in a mobile device initially unauthorized to receive telecommunication service within a confined area.

In addition to monitoring attachment signaling, traffic can be monitored to generate intelligence that can lead to a user of the monitored device or associate(s). FIG. 16 displays a flowchart of an example method 1600 for monitoring traffic originated in a mobile device initially unauthorized to receive telecommunication service within a confined area. Component(s) or processor(s) that enact example method 1500 also can enact the subject example method 1600. At act 1610, it is determined if multiple unauthorized attachment attempts are identified for a specific UE ID. In an aspect, such determination can be accomplished by polling a memory element (a database, a set of files, etc.) that retains records of unauthorized attachment signaling. A negative outcome directs flow to act 1610. Conversely, a positive determination leads to act 1620, at which a directive to include the UE ID (e.g., IMSI, ENS, IMEI, MEID . . . ) in an access control list (ACL) in order to grant access to femtocell wireless service within the confined area. In an aspect, the ACL can be associated with a particular, limited set of femtocell APs, e.g., femto APs $110_1$ and $110_N$, that provide wireless coverage within a specific location within the confined area; inclusion of the UE ID in such limited set of femtocell APs can bound the number of potential offenders that utilize the identified UE. For instance, in a correctional facility, a femtocell AP that serves a laundry facility can be supplied with an ACL that includes the identified UE ID; thus, increased physical security and on-location tracking equipment (e.g., tunable radiation tracking equipment, surveillance cameras . . . ) can be deployed within the laundry facility at times in which utilization of the identified UE is expected. At act 1630, data or traffic on call session(s) established by the identified UE can be received. Traffic can be received in compliance with law enforcement regulation(s), such as the Communications Assistance for Law Enforcement Act (CALEA).

At act 1640, intelligence on the call session(s) is generated to track, at least in part, originator thereof or related associate(s). The intelligence can include at least one of time at which the call session(s) is established, duration of the call session(s), content(s) of the call session(s), or destination of the call session. Intelligence also can include records on utilization of messaging service, e.g., SMS, such as destination of message(s) and content thereof. In addition, intelligence can be aggregated to identify a user and to generate evidence of violation of telecommunication service code(s). Aggregation can include generation of a user-specific profile that comprises identification of recipient (e.g., known associates, family members) of call(s) originated in identified UE, or destination of call(s) such as location(s) within confined area.

Figure 17:
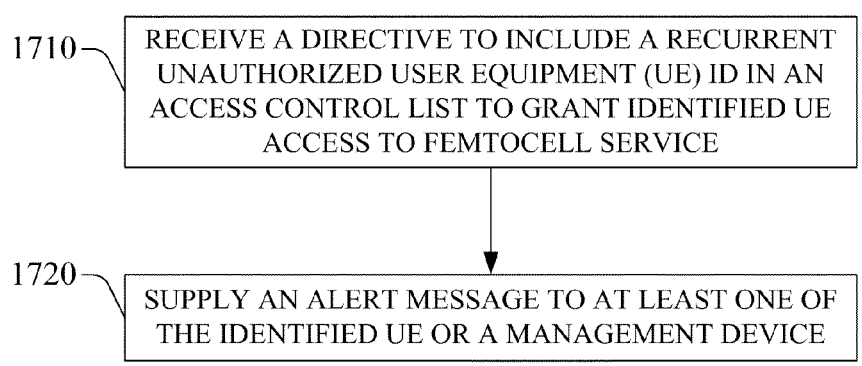
FIG. 17 is a flowchart of an example method for disclosing monitoring of a specific mobile device that operates or intends to operate within a restricted telecommunication area according to aspects described herein.

FIG. 17 is a flowchart of an example method 1700 for disclosing monitoring of a specific mobile device that operates or intends to operate within a restricted telecommunication area according to aspects described herein. The subject example method can be carried out by an indoor-based AP, e.g., femtocell AP, or one or more components therein, that supply at least part of wireless telecommunication service within the restricted telecommunication area. Alternatively or additionally, one or more processors can enact the subject example method 1500; the one or more processors can be configured to provide or can provide, at least in part, functionality to the indoor-based AP or one or more components therein. At act 1710, a directive to include a recurrent unauthorized UE ID in an ACL is received, inclusion of the UE ID in the ACL grants identified UE access to femtocell service. The ACL can be retained in a memory within the indoor-based AP that can enact the subject method, or within disparate indoor-based APs, e.g., femtocell AP $110_\lambda$. The indoor-based AP or one or more component therein can effect the directive, e.g., execute the directive, to include the UE ID in the ACL. In an aspect, the directive can be embodied in a multi-bit word (e.g., P-bit words, with P a natural number) and coded to convey specific instruction(s) for manipulating the ACL.

At act 1720, an alert message is supplied to at least one of the identified UE or a management device. The alert message can be at least one of a call (voice or data) or a message communication (e.g., a short message service (SMS) communication or a multimedia messaging service (MMS), or an unstructured supplementary service data (USSD) code). As an example, the alert message can convey the following: "Unauthorized mobile device; telecommunication will be monitored." Other alert content also can be conveyed.

Figure 18:
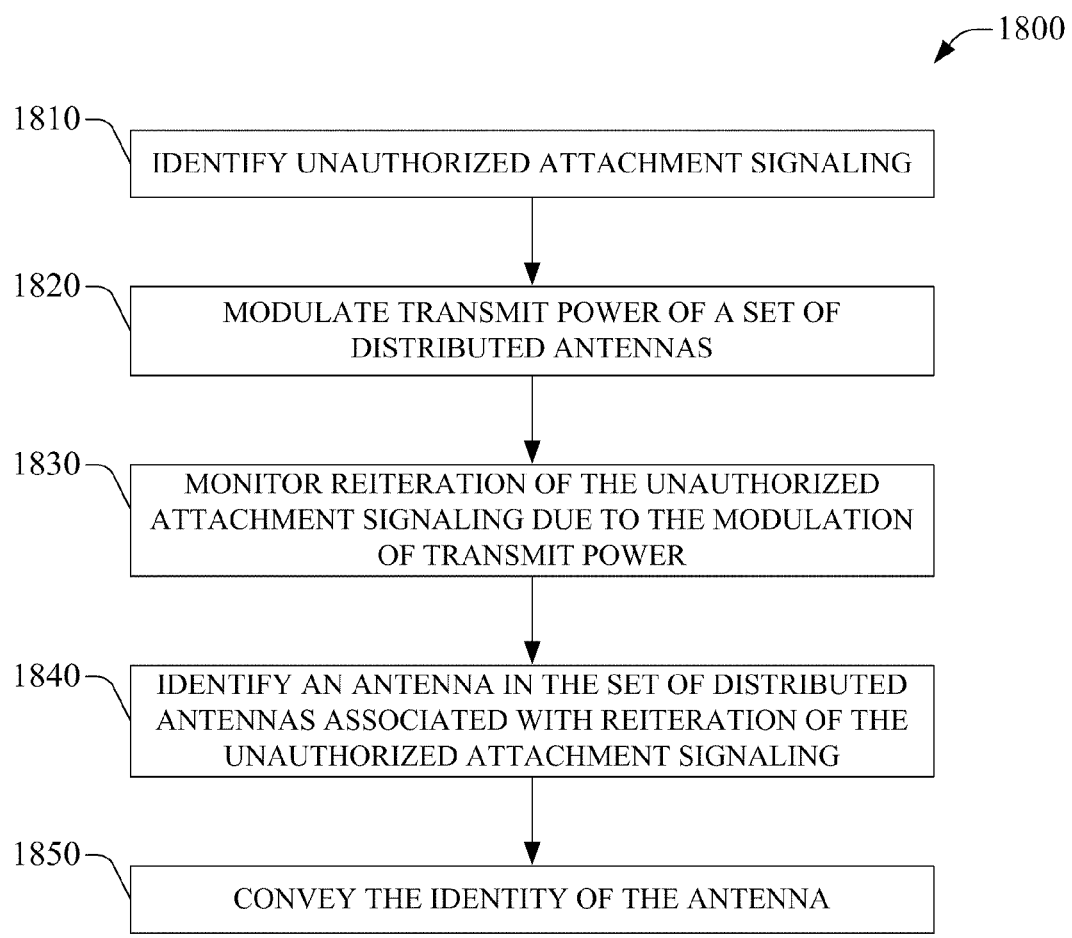
FIG. 18 is a flowchart of an example method for locating an unauthorized mobile device within a confined area in which telecommunication is restricted.

FIG. 18 presents a flowchart of an example method 1800 for locating an unauthorized mobile device within a confined area in which telecommunication is restricted. The subject example method can be performed as part of act 1040. One or more indoor-based access points (e.g., femtocell AP(s) $110_1$-$110_N$) can implement the subject example method. Alternatively or additionally, one or more processors can enact the subject example method 1800; the one or more processors can be configured to provide or can provide, at least in part, functionality to the one or more indoor-based access points or components that control the one or more indoor-based access points and distributed antenna system(s) functionally coupled thereto. At act 1810, unauthorized attachment signaling is identified. For example, UE ID (IMSI, temporary mobile subscriber identity (TMSI), packet TMSI (P-TMSI), etc.) in unauthorized LAU or RAU signaling is identified. At act 1820, transmit power of a set of distributed antennas, e.g., antenna set 148, is modulated. Modulation can include decrements and increments to transmit power of each antenna in the set of distributed antennas in accordance with a predetermined modulation sequence. Such modulation sequence can include at least one of modulation waveform, e.g., amplitude of transmit power at each antenna in the set of distributed antennas; interval of radiation at a specific power; or modulation frequency. At act 1830, reiteration of the unauthorized attachment signaling (e.g., unauthorized LAU or RAU signaling) originated by the identified UE ID is monitored; such reiteration is due to the modulation of transmit power of the set of distributed antennas. At act 1840, an antenna in the set of distributed antennas associated with reiteration of unauthorized attachment signaling is identified. Correlation of data on attachment signaling reiteration and features of modulation sequence can lead to the identification of the antenna. At act 1850, the identity of the antenna is conveyed. Accordingly, the unauthorized user equipment can be located within the coverage area of a transmission point associated with the identified antenna.

Figure 19:
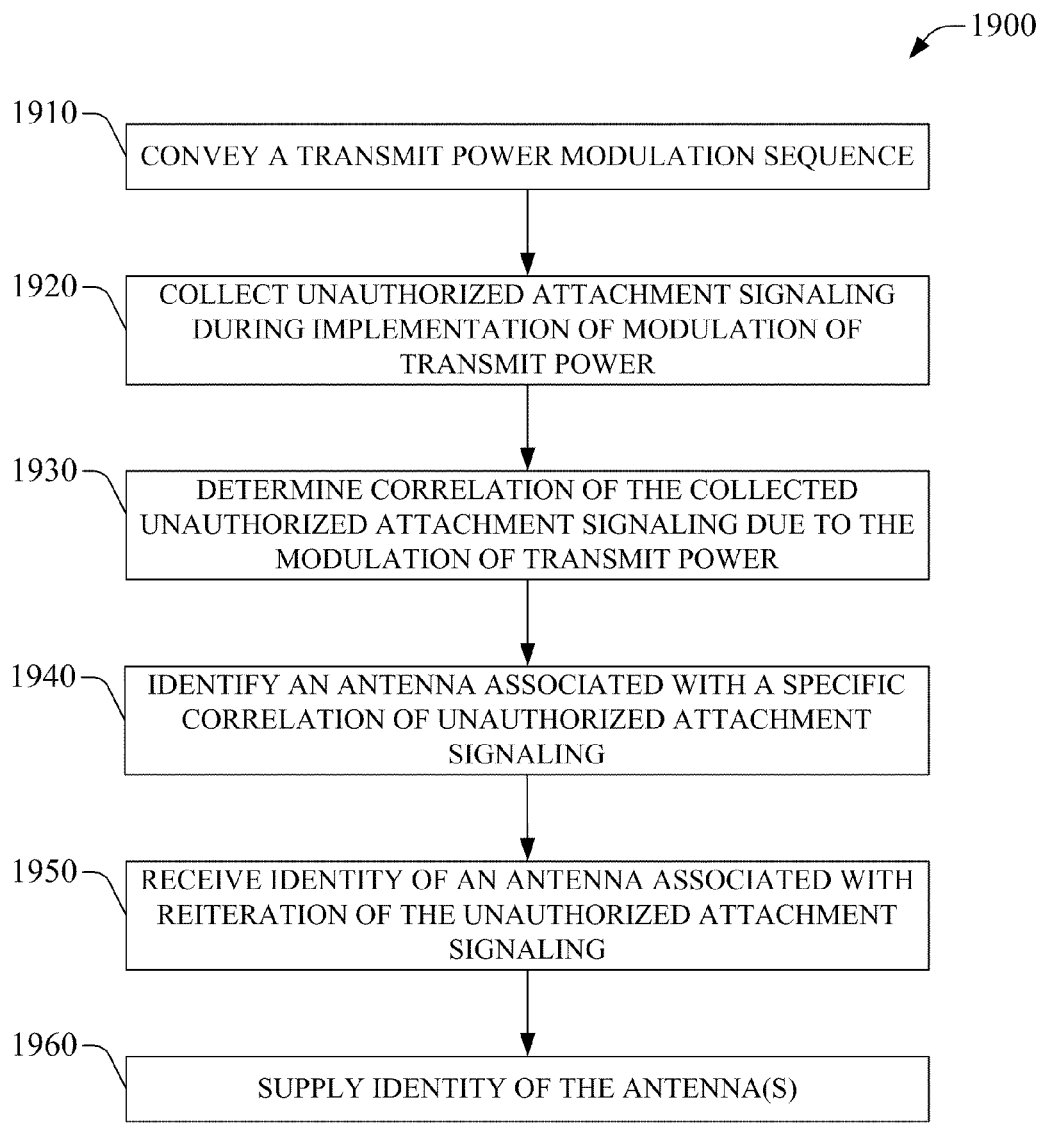
FIG. 19 is a flowchart of an example method for locating an unauthorized mobile device within a confined area in which telecommunication is restricted.

FIG. 19 is a flowchart of an example method 1900 for locating an unauthorized mobile device within a confined area in which telecommunication is restricted. The subject example method can be performed as part of act 1040. The subject example method 1900 can be implemented by one or more components that control the femtocell AP; for instance, administration component 120 and component(s) therein. Alternatively or additionally, one or more processors can enact the subject example method 1900; the one or more processors can be configured to provide or can provide, at least in part, functionality to the one or components that control the femtocell AP. At act 1910, a transmit power modulation sequence is conveyed. In an aspect, such modulation sequence can be generated by control component 124 and retained in memory 130. The modulation sequence dictates changes in transmit power of a set of transmission points associated with a set of femtocell APs that can serve a confined area. At act 1920, unauthorized attachment signaling is collected during implementation of modulation of transmit power. An indication that transmit power is modulated as part of seeking a location estimate of a mobile device in the confined area can be received prior to collecting the unauthorized attachment signaling. At act 1930, correlation of unauthorized attachment signaling due to the modulation of transmit power is monitored. Correlation can be at least one of spatial or temporal, and it can be specific to a mobile device, e.g., IMSI-specific. Monitoring such correlation can reveal femtocell APs with related attachment signaling activity. At act 1940, an antenna associated with a specific correlation of unauthorized attachment signaling is identified. For example, the antenna can be part of transmission point that receives unauthorized attachment signaling if a neighboring point reduces TX power substantially. At act 1950, identity of an antenna associated with reiteration of the unauthorized attachment signaling is received. At act 1960, identity of the antenna(s) is supplied. In an aspect, such identity(ies) is delivered as a location alarm, as described supra, to a mobile device operated by a human agent in a management role within an organization that deploys and utilizes example system 100.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory elements described herein can be affixed, removable, or a combination thereof.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

It should be appreciated that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   at least one memory storing computer-executable instructions;
   at least one processor communicatively coupled to the memory that facilitates execution of the computer-executable instructions to at least:
   scan, within a predetermined area, for a wireless resource, wherein the wireless resource comprises a control channel transmitted by a base station configured to serve a region external to the predetermined area;
   block, within the predetermined area, reception of a first instance of the control channel, wherein to block the reception, the at least one processor further facilitates the execution of the computer-executable instructions to at least:
   adjust a frequency of at least one blocking signal to overlap an identified frequency of the first instance of the control channel; and
   transmit the at least one blocking signal with a transmit power with a magnitude to block the first instance of the control channel;
   generate a second instance of the control channel based on the first instance of the control channel;
   forward the second instance of the control channel to an access point, wherein the access point has a unique location area code and is associated with a plurality of antennas, wherein the plurality of antennas facilitate communication of the second instance of the control channel in the predetermined area; and
   identify a location of a mobile device in the predetermined area that attempts to access the second instance of the control channel based on a location of a first antenna in the plurality of antennas via which the mobile device attempts to access the second instance of the control channel.

2. The system of claim 1, wherein the control channel comprises a wireless signal transmitted in accordance with at least one electromagnetic radiation frequency band and in accordance with at least one radio technology protocol.

3. The system of claim 1, wherein the at least one processor further facilitates the execution of the computer-executable instructions to:
schedule at least one frequency carrier to spectrally overlap the control channel, and
transmit, via the access point, the at least one frequency carrier at a power level configured to block reception of the control channel by the mobile device within the predetermined area.

4. The system of claim 1, wherein the at least one processor further facilitates the execution of the computer-executable instructions to control access to the second instance of the control channel based at least in part on an access control list that comprises a field attribute configured to identify whether the mobile device is allowed to access the second instance of the control channel in the predetermined area, and the access control list further comprises a set of attributes configured to regulate at least one feature of a service associated with the wireless resource.

5. The system of claim 4, wherein the at least one processor further facilitates the execution of the computer-executable instructions to monitor signaling associated with the second instance of the control channel.

6. The system of claim 5, wherein the at least one processor further facilitates the execution of the computer-executable instructions to aggregate signaling associated with the second instance of the control channel, wherein aggregation comprises generation of statistics which relate to attachment signaling by the mobile device to the second instance of the control channel.

7. The system of claim 4,
wherein the at least one processor further facilitates the execution of the computer-executable instructions to update the access control list based at least in part on at least one control criterion.

8. The system of claim 1, wherein the at least one processor further facilitates the execution of the computer-executable instructions to request an identification credential of a subscriber linked to an unauthorized mobile device within the predetermined area, and to allow access of the wireless resource by the mobile device in response to receipt of a consent to monitoring.

9. The system of claim 5, wherein the at least one processor further facilitates the execution of the computer-executable instructions to identify the mobile device based at least in part on at least a portion of signaling generated by the mobile device in attempt to access the second instance of the control channel.

10. The system of claim 5, wherein the at least one processor further facilitates the execution of the computer-executable instructions to initiate a protocol to facilitate selection of the wireless resource for access control, wherein the protocol relates to a plurality of wireless resources detected by the scan for the wireless resource in accordance with at least one electromagnetic radiation frequency and in accordance with at least one radio technology protocol.

11. The system of claim 1, wherein another access point conveys the second instance of the control channel, and the access point and the other access point have disparate location area codes.

12. The system of claim 1, wherein the first instance of the control channel and the second instance of the control channel are disparate.

13. A method, comprising:
scanning, within a confined area by a system comprising at least one processor, for a wireless control channel signal being transmitted by a telecommunication service accessible outside of the confined area;
blocking, by the system, within the confined area, reception of a first instance of the wireless control channel signal, wherein the blocking further comprises:
adjusting a frequency of at least one blocking signal to overlap an identified frequency of the first instance of the wireless control channel signal; and
transmitting the at least one blocking signal with a transmit power of a magnitude that blocks the first instance of the wireless control channel signal;
generating, by the system, a second instance of the wireless control channel signal based on the first instance of the wireless control channel signal;
conveying the second instance of the wireless control channel signal by a first access point in a plurality of access points, wherein each access point has a unique location area code and an associated set of distributed antennas;
controlling, by the system, access of the second instance of the wireless control channel signal to facilitate access, by a mobile device located within the confined area, to the telecommunication service accessible outside of the confined area; and
identifying, within the confined area, location of the mobile device attempting to access the second instance of the wireless control channel signal based at least in part on determining location of an antenna in the set of distributed antennas, associated with the first access point, being utilized to convey the second instance of the wireless control channel signal.

14. The method of claim 13, wherein the controlling access to the second instance of the wireless control channel signal is based at least in part on information comprising an access control list, wherein the information includes, at least one attribute identifying the mobile device being authorized to access the telecommunication service.

15. The method of claim 14, further comprising:
updating the access control list in accordance with a provisioned set of criteria.

16. The method of claim 13, wherein the controlling access to the second instance of the control channel further comprises:
receiving a notification of unauthorized attachment signaling by the mobile device to the second instance of the control channel;
requesting at least one credential of a subscriber associated with the mobile device;
receiving the at least one credential; and
enabling access by the mobile device to the second instance of the control channel in response to determining the at least one credential indicates access of the mobile device to the second instance of the control channel is granted.

17. The method of claim 14, wherein the controlling access to the second instance of the control channel further comprises:
receiving a request for attachment signaling from the mobile device;
validating the mobile device with at least one attribute comprising an access control list;

in response to the validation failing, rejecting the request for attachment signaling from the mobile device and further generating a notification of unauthorized attachment signaling; and in response to the validation succeeding, accepting the request for attachment signaling and enabling access of the telecommunication service by the mobile device.

18. The method of claim 13, further comprising identifying the first instance of the wireless control channel signal being transmitted by the telecommunication service accessible outside of the confined area; and blocking the first instance of the wireless control channel signal including transmitting at least one frequency carrier spectrally overlapping the first instance of the wireless control channel signal.

19. The method of claim 13, further comprising receiving an indication of unauthorized attachment signaling being performed by the mobile device;

recording the indication of unauthorized attachment signaling;

retrieving, based in part on the recorded indication of unauthorized attachment signaling, a pattern of unauthorized attachment signaling within a specific period; and generating a report of unauthorized attachment signaling in the specific period for the mobile device.

20. The method of claim 13, wherein the controlling access of the second instance of the control channel by the mobile device further comprises:

generating a directive to include an attribute identifying the mobile device in an access control list associated with access to the telecommunication service;

receiving data related to at least one call session initiated by the mobile device; and based at least in part on the received data, generating intelligence on the at least one call session to track, at least in part, an originator of the at least one call session.

21. The method of claim 13, further comprising:

identifying an indication of unauthorized attachment signaling being performed by the mobile device;

modulating transmit power of the set of distributed antennas associated with the first access point transmitting the second instance of the control channel in the confined area;

monitoring reiteration of the unauthorized attachment signaling based at least in part on the modulation of transmit power of the set of distributed antennas; and identifying the antenna in the set of distributed antennas based at least in part on the modulation of transmit power of the antenna.

22. The method of claim 13, further comprising:

supplying the identity of the antenna in the set of distributed antennas.

23. A non-transitory computer-readable storage medium, comprising computer executable instructions that, in response to execution, cause a first access point including at least one processor to perform operations, comprising:

scanning, with the first access point within a confined area, for a wireless control channel signal being transmitted by a telecommunication service accessible outside of the confined area;

blocking, with the first access point within the confined area, reception of a first instance of the wireless control channel signal;

wherein the blocking further comprises:

identifying a frequency of the first instance of the wireless control channel signal;

adjusting a frequency of at least one blocking signal to overlap the identified frequency of the first instance of the wireless control channel signal; and transmitting the at least one blocking signal with a transmit power of a magnitude that blocks the first instance of the wireless control channel signal;

generating a second instance of the wireless control channel signal based on the first instance of the wireless control channel signal;

conveying the second instance of the wireless control channel signal by the first access point in a plurality of access points in the confined area, wherein the plurality of access points include respective location area codes and associated sets of distributed antennas;

controlling, by the first access point, access of the second instance of the wireless control channel signal to facilitate access, by a mobile device located within the confined area to the telecommunication service accessible outside of the confined area; and identifying, by the first access point within the confined area, a device location of the mobile device attempting to access the second instance of the wireless control channel signal based at least in part on determining an antenna location in a set of distributed antennas respectively associated with the first access point, the device location being utilized to convey the second instance of the wireless control channel signal.

* * * * *